United States Patent
Fujii et al.

(10) Patent No.: US 11,521,259 B2
(45) Date of Patent: Dec. 6, 2022

(54) SYSTEM, INFORMATION PROCESSING APPARATUS, INFORMATION PROCESSING METHOD, AND NON-TRANSITORY COMPUTER READABLE MEDIUM

(71) Applicant: TOYOTA JIDOSHA KABUSHIKI KAISHA, Toyota (JP)

(72) Inventors: Shinichiro Fujii, Kawasaki (JP); Hiroe Fukui, Toyohashi (JP); Takashi Goto, Okazaki (JP); Tatsuya Shigekiyo, Okazaki (JP); Kuniaki Jinnai, Nagoya (JP); Naoto Sasagawa, Nishio (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 105 days.

(21) Appl. No.: 16/718,509

(22) Filed: Dec. 18, 2019

(65) Prior Publication Data
US 2020/0234361 A1 Jul. 23, 2020

(30) Foreign Application Priority Data
Jan. 18, 2019 (JP) .............................. JP2019-006922

(51) Int. Cl.
G06Q 30/00 (2012.01)
G06Q 30/06 (2012.01)
G06Q 30/02 (2012.01)

(52) U.S. Cl.
CPC ..... *G06Q 30/0635* (2013.01); *G06Q 30/0205* (2013.01); *G06Q 30/0224* (2013.01); *G06Q 30/0631* (2013.01)

(58) Field of Classification Search
CPC ............ G06G 30/0635; G05D 1/0088; G05D 1/0212; G06Q 30/0205; G06Q 30/0224; G06Q 30/0631
(Continued)

(56) References Cited

U.S. PATENT DOCUMENTS 10,949,796 B1* 3/2021 Tsou ..................... G06Q 10/087
11,222,299 B1* 1/2022 Baalke ................. G06Q 10/087
(Continued)

FOREIGN PATENT DOCUMENTS

JP 2011-204151 A 10/2011

OTHER PUBLICATIONS

Pizza hut® forges global alliance with toyota® to explore fully-autonomous delivery vehicles: Pizza hut pioneering uses of new toyota e-palette fully-autonomous concept vehicle unveiled at consumer electronics show; brands collaborating on big data to advance delivery intelligence. (Jan. 8, 2018). (Year: 2018).*
(Continued)

*Primary Examiner* — Michelle T Kringen
*Assistant Examiner* — Arielle E Weiner
(74) *Attorney, Agent, or Firm* — Oblon, McClelland, Maier & Neustadt, L.L.P.

(57) ABSTRACT

A server apparatus as a management apparatus in a system includes a controller configured to execute acquiring commodity-or-the-like purchase information of a user in a first mobile store from a store device of the first mobile store, selecting a commodity or a service predicted to be purchased next by the user based on commodities or services in the acquired commodity-or-the-like purchase information, and transmitting information regarding the user to a store device of a second mobile store dealing in the selected commodity or service.

18 Claims, 14 Drawing Sheets

(58) Field of Classification Search
USPC .................................................... 705/26.81
See application file for complete search history.

(56) References Cited

U.S. PATENT DOCUMENTS

| | | | |
|---|---|---|---|
| 2017/0228808 A1* | 8/2017 | Kumar | G06Q 20/20 |
| 2018/0025635 A1* | 1/2018 | Cheaz | G05D 1/0297 |
| | | | 701/23 |
| 2018/0053369 A1* | 2/2018 | High | G01C 21/3605 |
| 2019/0034858 A1* | 1/2019 | Ferguson | G05D 1/0094 |
| 2019/0043001 A1* | 2/2019 | Woulfe | G06Q 10/083 |
| 2019/0050951 A1* | 2/2019 | Goldberg | G05D 1/0276 |
| 2019/0056751 A1* | 2/2019 | Ferguson | G01C 21/3438 |
| 2020/0063626 A1* | 2/2020 | Dudar | F02N 11/0829 |

OTHER PUBLICATIONS

Ref U Cont: PR Newswire Retrieved from https://www.proquest.com/wire-feeds/pizza-hut®-forges-global-alliance-with-toyota®/docview/1985634745/se-2?accountid=14753 (Year: 2018).*

* cited by examiner

FIG. 2
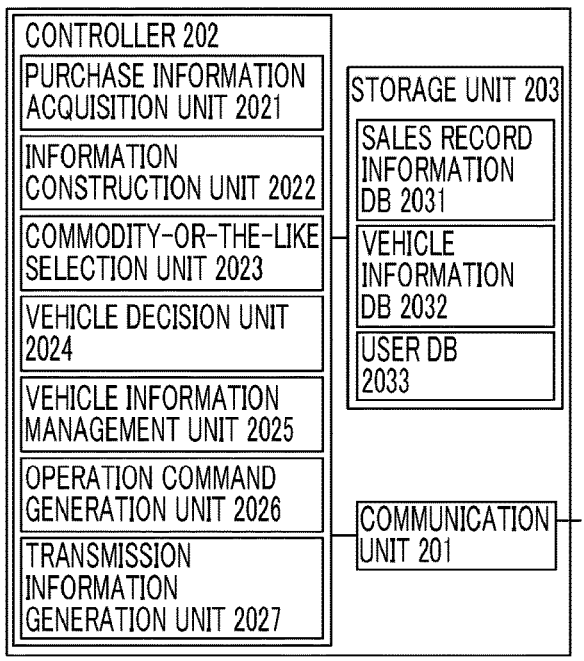
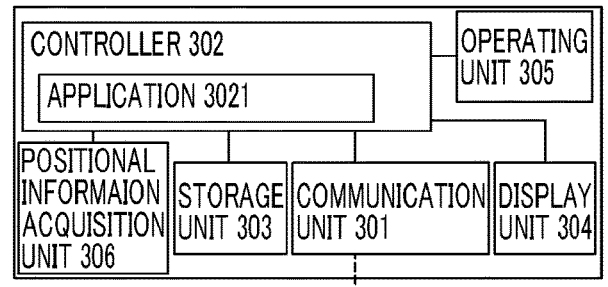
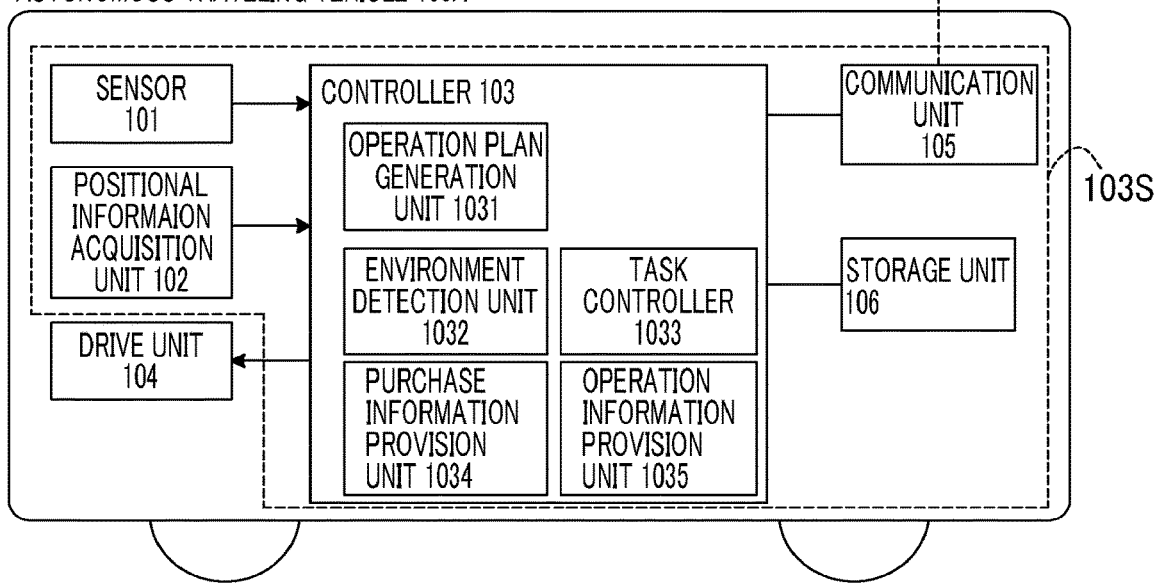

FIG. 3A

| ORDER | 1 | 2 | 3 | 4 | 5 | ... |
|---|---|---|---|---|---|---|
| COMMODITY AND THE LIKE | COMMODITY 1 | COMMODITY 2 | COMMODITY 3 | COMMODITY 4 | COMMODITY 5 | ... |

| ORDER | 1 | 2 | 3 | 4 | 5 | ... |
|---|---|---|---|---|---|---|
| COMMODITY AND THE LIKE | COMMODITY 1 | COMMODITY 2 | COMMODITY 5 | COMMODITY 4 | COMMODITY 6 | ... |

| ORDER | 1 | 2 | 3 | 4 | 5 | ... |
|---|---|---|---|---|---|---|
| COMMODITY AND THE LIKE | COMMODITY 1 | COMMODITY 2 | COMMODITY 5 | COMMODITY 4 | COMMODITY 3 | ... |

| ORDER | 1 | 2 | 3 | 4 | 5 | ... |
|---|---|---|---|---|---|---|
| COMMODITY AND THE LIKE | COMMODITY 1 | COMMODITY 2 | COMMODITY 5 | COMMODITY 4 | COMMODITY 3 | ... |

2031

FIG. 7
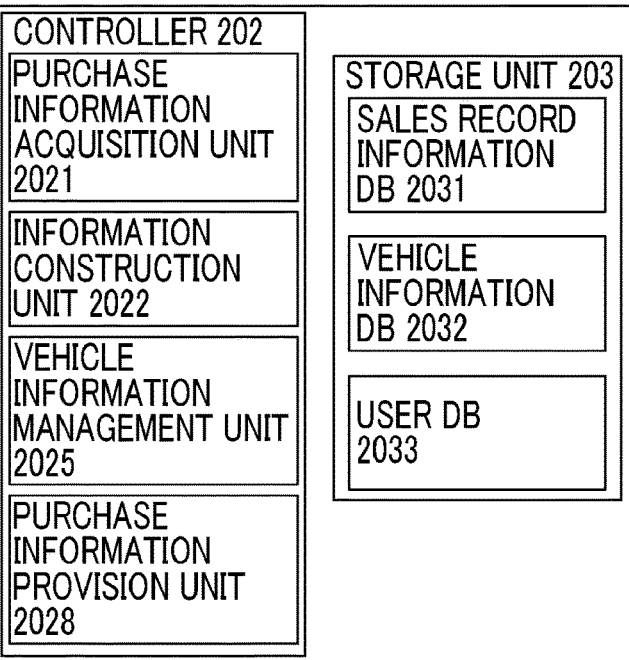
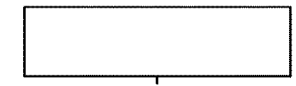
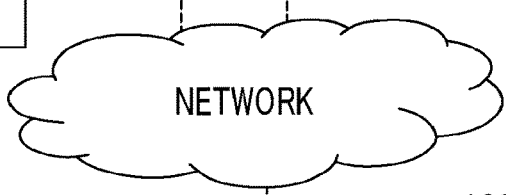
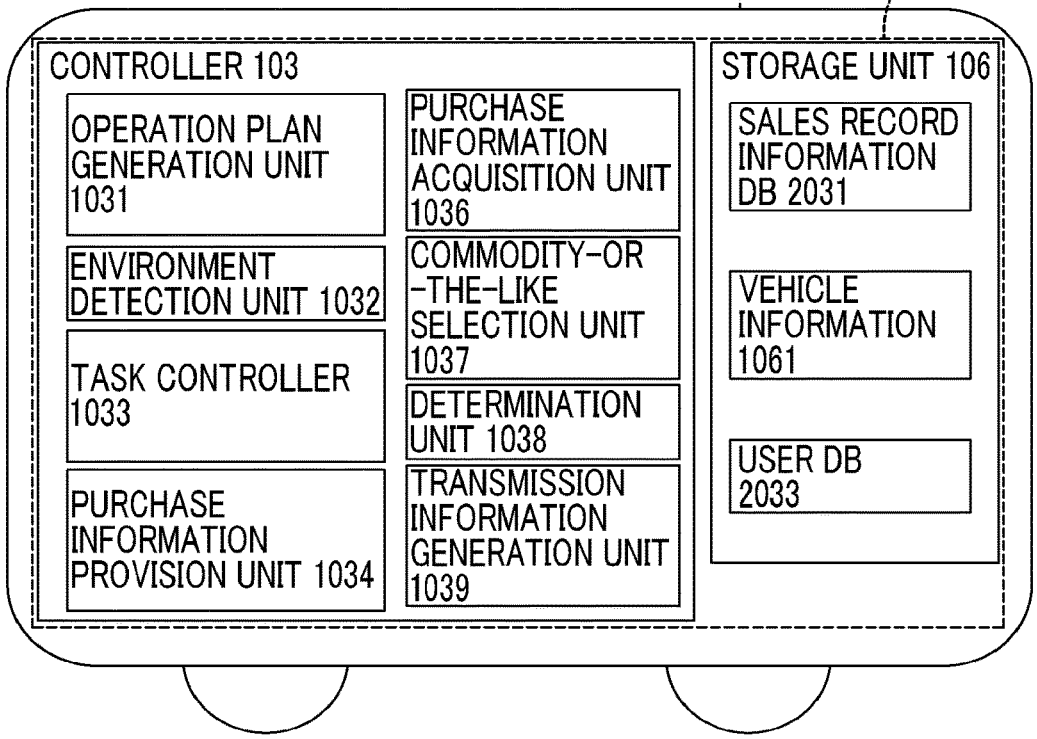

FIG. 11

SERVER APPARATUS 200

CONTROLLER 202
- PURCHASE INFORMATION ACQUISITION UNIT 2021
- INFORMATION CONSTRUCTION UNIT 2022
- VEHICLE INFORMATION MANAGEMENT UNIT 2025

STORAGE UNIT 203
- SALES RECORD INFORMATION DB 2031
- VEHICLE INFORMATION DB 2032
- USER DB 2033

USER APPARATUS 300A

NETWORK

AUTONOMOUS TRAVELING VEHICLE 100A — 103S

CONTROLLER 103
- OPERATION PLAN GENERATION UNIT 1031
- ENVIRONMENT DETECTION UNIT 1032
- TASK CONTROLLER 1033
- PURCHASE INFORMATION PROVISION UNIT 1034
- PURCHASE INFORMATION ACQUISITION UNIT 1036
- COMMODITY-OR-THE-LIKE SELECTION UNIT 1037
- TRANSMISSION INFORMATION GENERATION UNIT 1039
- VEHICLE DECISION UNIT 1040
- OPERATION COMMAND GENERATION UNIT 1041

STORAGE UNIT 106
- SALES RECORD INFORMATION DB 2031
- VEHICLE INFORMATION DB 2032
- VEHICLE INFORMATION 1061
- USER DB 2033

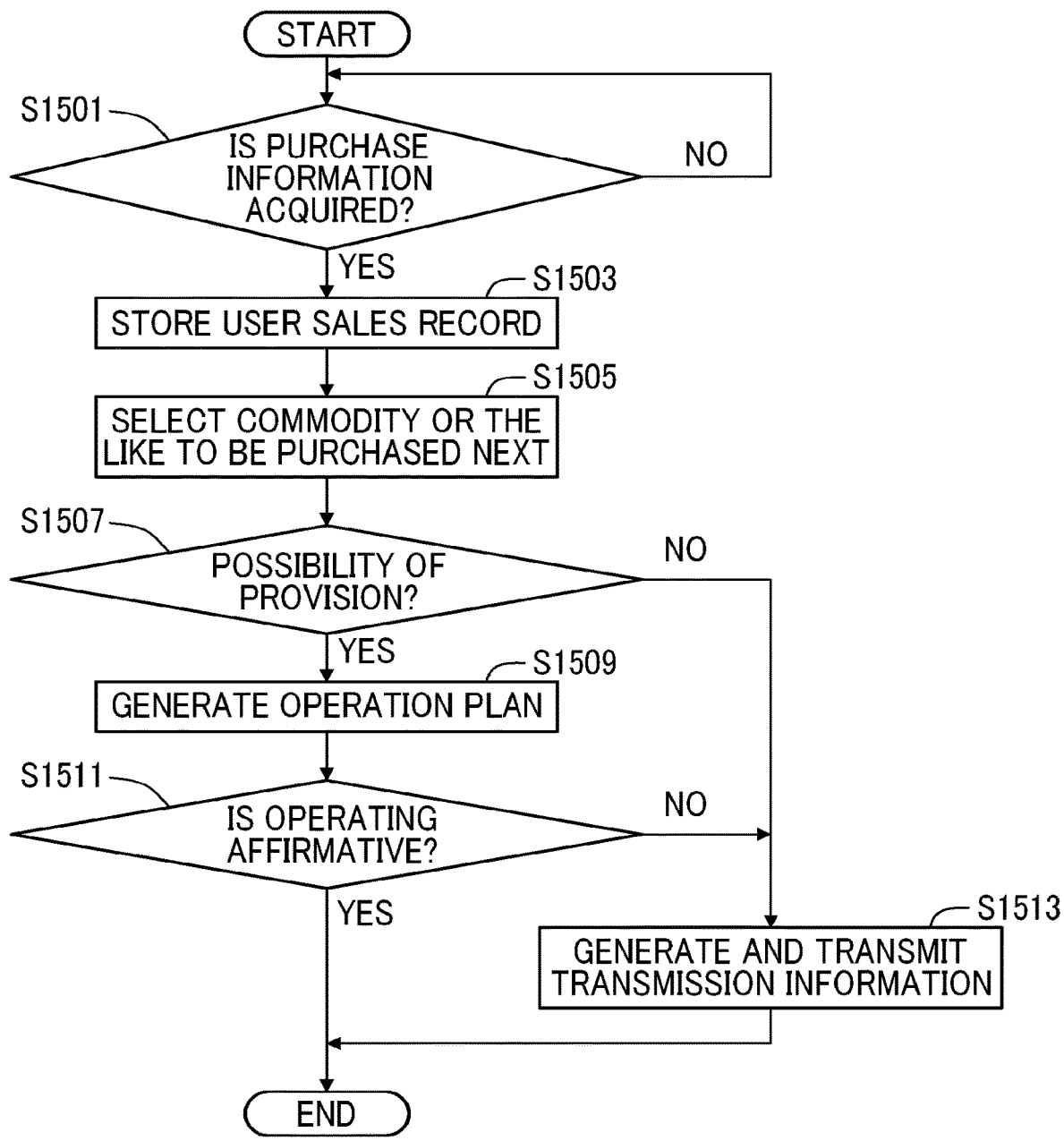

SYSTEM, INFORMATION PROCESSING APPARATUS, INFORMATION PROCESSING METHOD, AND NON-TRANSITORY COMPUTER READABLE MEDIUM

INCORPORATION BY REFERENCE

The disclosure of Japanese Patent Application No. 2019-006922 filed on Jan. 18, 2019 including the specification, drawings and abstract is incorporated herein by reference in its entirety.

BACKGROUND

1. Technical Field

The present disclosure relates to a system, an information processing apparatus, an information processing method that is executed by at least one computer, and a program.

2. Description of Related Art

A technique disclosed in Japanese Unexamined Patent Application Publication No. 2011-204151 (JP 2011-204151 A) is directed towards allowing not only a host vehicle but also peripheral vehicles to accurately ascertain a relative positional relationship of each vehicle around the host vehicle including a vehicle incapable of directly performing communication using inter-vehicle communication without using a special map database.

SUMMARY

Incidentally, a mobile store constituted to function as, for example, a restaurant or a retail store is known. Such a mobile store has a limited store space, and thus, there are often cases where commodities or services that are dealt in the mobile store are limited. In recent years, various commodities or services that are dealt in the mobile store have been widespread. However, there are cases where the mobile store has an independent store opening location, and mostly, there is a limit on a mobile store that a user, such as a customer, can encounter. Accordingly, the disclosure provides a technique that performs support such that a user who purchases a certain commodity or service, such as a customer, can use a desirable mobile store.

A first object of the disclosure relates to a system. The system includes a management apparatus, and a plurality of store devices provided in a plurality of mobile stores, respectively. A controller of the management apparatus is configured to execute acquiring commodity-or-the-like purchase information of a user in a first mobile store from a store device of the first mobile store, selecting a commodity or a service predicted to be purchased next by the user based on commodities or services in the acquired commodity-or-the-like purchase information, and transmitting information regarding the user to a store device of a second mobile store dealing in the selected commodity or service. A second aspect of the disclosure relates to a system. The system includes a management apparatus, and a plurality of store devices provided in a plurality of mobile stores, respectively. The management apparatus is configured to execute acquiring commodity-or-the-like purchase information of a user in a first mobile store from the store device of the first mobile store and transmitting the acquired commodity-or-the-like purchase information to a store device of a second mobile store. The store device of the second mobile store is configured to determine whether or not the predicted commodity or service predicted to be purchased next by the user is a commodity or a service providable in the second mobile store based on the acquired commodity-or-the-like purchase information and execute processing based on a determination result. A third aspect of the disclosure relates to an information processing apparatus including a controller. The controller is configured to execute acquiring commodity-or-the-like purchase information of a user in a first mobile store, selecting a commodity or a service predicted to be purchased next by the user based on commodities or services in the acquired commodity-or-the-like purchase information of the user, and transmitting information regarding the user to a second mobile store dealing in the selected commodity or service. A fourth aspect of the disclosure relates to an information processing apparatus that is provided in a first mobile store among a plurality of mobile stores. The information processing apparatus includes a controller. The controller is configured to execute acquiring commodity-or-the-like purchase information of a user in the first mobile store, selecting a commodity or a service predicted to be purchased next by the user based on commodities or services in the acquired commodity-or-the-like purchase information of the user, and transmitting information regarding the user to a second mobile store dealing in the selected commodity or service. A fifth aspect of the disclosure relates to an information processing apparatus that is provided in a second mobile store among a plurality of mobile stores. The information processing apparatus includes a controller. The controller is configured to acquiring commodity-or-the-like purchase information of a user in a first mobile store from a store device of the first mobile store, determine whether or not a predicted commodity or service predicted to be purchased next by the user is a commodity or a service providable in the second mobile store based on the acquired commodity-or-the-like purchase information, and execute processing based on a determination result. A sixth aspect of the disclosure relates to an information processing method that is executed by at least one computer in the system or the like. A seventh aspect of the disclosure relates to a program that causes at least one computer in the system or the like to execute the information processing method.

According to the system, it is possible to perform support such that a user who purchases a certain commodity or service can appropriately use a desirable mobile store.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2 is a block diagram schematically illustrating an example of components in the system of FIG. 1;

FIG. 3A is a table showing an example of purchase information of commodities or the like of a user A;

FIG. 3B is a table showing an example of purchase information of commodities or the like of a user B;

FIG. 3C is a table showing an example of purchase information of commodities or the like of a user C;

FIG. 4 is a table showing a part of a sales record information database as an example;

FIG. 7 is a block diagram schematically illustrating an example of components in the system of FIG. 6;

FIG. 11 is a block diagram schematically illustrating an example of components in the system of FIG. 10;

FIG. 15 is a flowchart showing a part of processing in the system of the fourth embodiment.

DETAILED DESCRIPTION OF EMBODIMENTS

Figure 1:
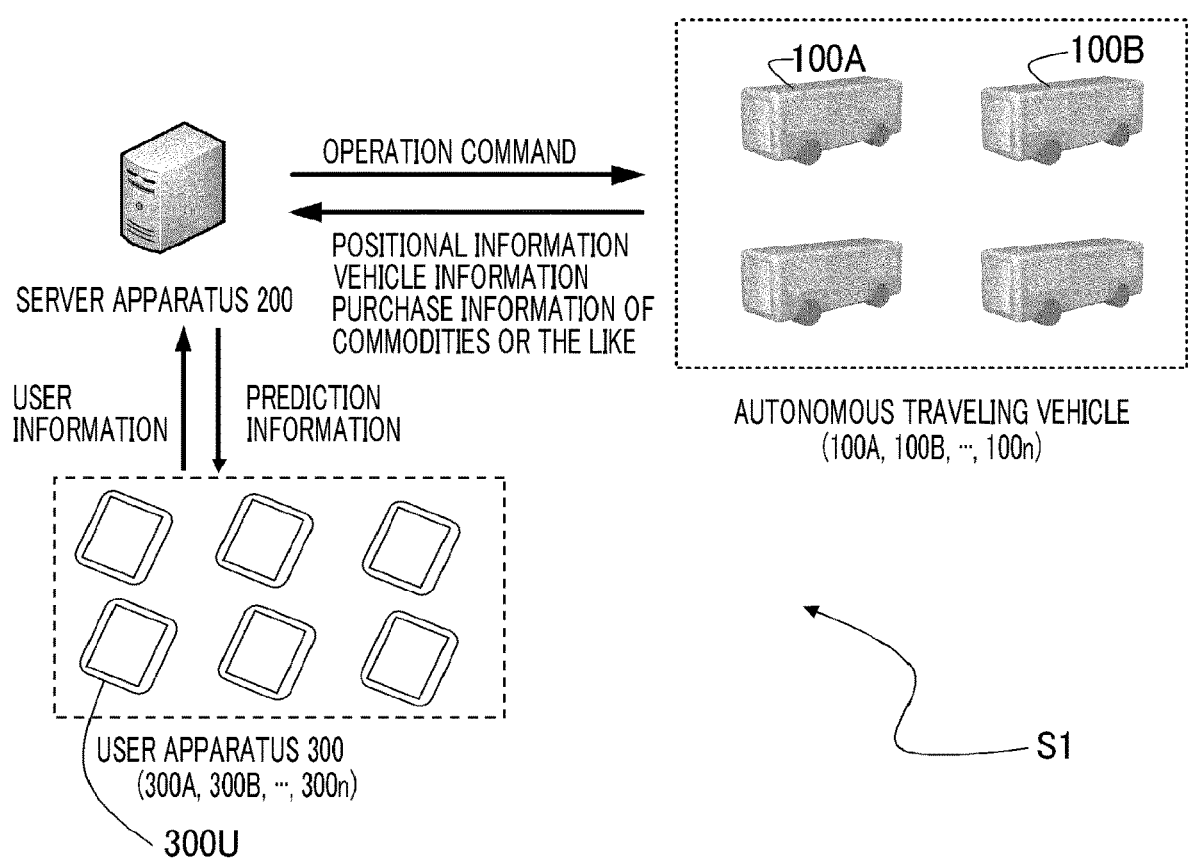
FIG. 1 shows an operation example of a system according to a first embodiment.

Hereinafter, a system, an information processing method in the system, and a program according to an embodiment of the disclosure will be described referring to the drawings.

A server apparatus 200 as a management apparatus in a system S1 according to a first embodiment of the disclosure is a computer on a network. The server apparatus 200 is configured to perform communication with autonomous traveling vehicles 100 (100A, 100B, . . . , 100n).

The autonomous traveling vehicles 100 are also referred to as electric vehicle (EV) pallets. The autonomous traveling vehicles 100 are moving objects capable of autonomous driving and unmanned driving, and have various sizes according to purposes. For example, the autonomous traveling vehicle 100 having various sizes including a small vehicle of a size suitable for transporting several books and a large vehicle capable of carrying a person and an object. In particular, in the embodiment, the autonomous traveling vehicles 100 are vehicles usable as mobile stores, respectively. As the mobile stores, a retail store, a restaurant, and the like can be known, and a pastry shop, a flower store, a shoe store, a clothing store, and a coffee shop can be exemplified. Each of the autonomous traveling vehicles 100 includes an information processing apparatus 103S as a store device, and has a controller 103 that substantially has the functions of the information processing apparatus 103S. Accordingly, the system S1 includes a plurality of store devices connected to the server apparatus 200 through the network.

The autonomous traveling vehicle 100 has a controller 103 and a communication device for controlling the autonomous traveling vehicle 100, providing a user interface with a user who uses the autonomous traveling vehicle 100, transmitting and receiving information to and from various servers on the network, and the like. The autonomous traveling vehicle 100 provides the user with functions and services added by various servers on the network in cooperation with various servers on the network in addition to processing executable by the autonomous traveling vehicle 100 alone. The autonomous traveling vehicle 100 is not necessarily an unmanned vehicle. For example, a sales personnel, a service personnel, a security personnel, or the like may board the autonomous traveling vehicle 100. The autonomous traveling vehicle 100 may not necessarily be a vehicle capable of complete autonomous traveling. For example, the autonomous traveling vehicle 100 may be a vehicle in which a person performs driving and supports driving according to circumstances. In the embodiment, the autonomous traveling vehicle 100 may travel based on a predetermined operation command, may function as a mobile store, and may pick up or deliver, for example, a package.

In addition, the autonomous traveling vehicle 100 may have a function of receiving a request from the user, responding to the user, executing predetermined processing to the request from the user, and reporting a processing result to the user. In a case where a request among the requests from the user cannot be processed by the autonomous traveling vehicle 100 alone, the autonomous traveling vehicle 100 may transfer the request to the server apparatus 200 and may process the request in cooperation with the server apparatus 200.

The server apparatus 200 is configured to perform communication with user apparatuses 300 (300A, 300B, . . . , 300n). Each of the user apparatuses 300 is a terminal of each user, and can receive an input from the user and an operation conforming to the input and can transmit the input and the operation to the server apparatus 200.

The server apparatus 200 is also an apparatus that commands operation to the autonomous traveling vehicle 100. The server apparatus 200 can acquire information regarding purchase of commodities or services of the user from the store device of a certain autonomous traveling vehicle 100 as a mobile store, and can transmit information to other autonomous traveling vehicles 100 or the user apparatus 300.

The components in the system of FIG. 1 will be described in detail. FIG. 2 is a block diagram schematically showing an example of the configuration of the system including the autonomous traveling vehicle 100, the server apparatus 200, and the user apparatus 300 shown in FIG. 1. In FIG. 2, although the autonomous traveling vehicle 100A among a plurality of autonomous traveling vehicles 100 is illustrated, other autonomous traveling vehicles have the same configuration as the autonomous traveling vehicle 100A. Although FIG. 2 illustrates the user apparatus 300A among a plurality of user apparatuses 300, other user apparatuses have the same configuration as the user apparatus 300A.

The autonomous traveling vehicle 100A is a vehicle that travels according to the operation command acquired from the server apparatus 200. Specifically, the autonomous traveling vehicle 100A generates a traveling route based on the operation command acquired through wireless communication and travels on a road using an appropriate method while sensing the surroundings of the vehicle.

The autonomous traveling vehicle 100A includes a sensor 101, a positional information acquisition unit 102, the controller 103, a drive unit 104, a communication unit 105, and a storage unit 106. The autonomous traveling vehicle 100A operates with electric power supplied from a battery.

The sensor 101 is a unit that performs sensing of the vehicle surroundings, and typically includes a stereo camera, a laser scanner, a lidar (light detection and ranging or laser imaging detection and ranging), a radar, or the like. Information acquired from the sensor 101 is transmitted to the controller 103. The sensor 101 includes a sensor that is provided for allowing the host vehicle to perform autonomous traveling. The sensor 101 may include a camera that is provided in a vehicle body of the autonomous traveling vehicle 100. For example, the sensor 101 can include an imaging apparatus using an image sensor, such as chargedcoupled devices (CCD), a metal-oxide-semiconductor (MOS), or a complementary metal-oxide-semiconductor (CMOS). A plurality of camera may be provided at a plurality of places of the vehicle body. For example, cameras may be provided on a front side, a rear side, and right and left sides of the vehicle body.

The positional information acquisition unit 102 is a unit that acquires a current position of the vehicle, and typically includes a global positioning system (GPS) receiver or the like. Information acquired by the positional information acquisition unit 102 is transmitted to the controller 103. The GPS receiver as a satellite signal receiver receives signals from a plurality of GPS satellites. Each GPS satellite is an artificial satellite that orbits around the earth. A satellite positioning system, that is, a navigation satellite system (NSS) is not limited to the GPS. Positional information may be detected based on signals from various satellite positioning systems. The NSS is not limited to a global navigation satellite system, and may include a quasi-zenith satellite system, for example, may "Galileo" in Europe or "Michibiki" that is operated integrally with the GPS in Japan.

The controller 103 is a computer that performs control of the autonomous traveling vehicle 100A based on information acquired from the sensor 101, the positional information acquisition unit 102, and the like. In FIG. 2, the controller 103 substantially has a function as a store device of the autonomous traveling vehicle 100A. The controller 103 is an example of a controller that receives the operation command from the server apparatus 200 and controls traveling of the autonomous traveling vehicle 100A as a moving object.

The controller 103 has a CPU and a main storage unit, and executes information processing using a program. The CPU is also referred to as a processor. The main storage unit of the controller 103 is an example of a main storage device. The CPU in the controller 103 executes a computer program developed to be executable in the main storage unit, and provides various functions. The main storage unit in the controller 103 stores the computer program that is executed by the CPU, data, and the like. The main storage unit in the controller 103 is a dynamic random access memory (DRAM), a static random access memory (SRAM), a read only memory (ROM), or the like.

The controller 103 is connected to the storage unit 106. The storage unit 106 is a so-called external storage unit, is used as a storage area that supports the main storage unit of the controller 103, and stores the computer program that is executed by the CPU of the controller 103, data, and the like. The storage unit 106 is a hard disk drive, a solid state disk (SSD), or the like.

The controller 103 has, as functional modules, an operation plan generation unit 1031, an environment detection unit 1032, a task controller 1033, a purchase information provision unit 1034 on the vehicle 100A, and an operation information provision unit 1035. Each functional module is implemented by the controller 103, that is, the CPU in the controller 103 executing a program stored in the main storage unit or the storage unit 106.

The operation plan generation unit 1031 acquires an operation command from the server apparatus 200 and generates an operation plan of the host vehicle. In the embodiment, the operation plan is data that defines a route, along which the autonomous traveling vehicle 100A travels, and data defining processing to be executed by the autonomous traveling vehicle 100A in a part or the whole of the route. As an example of data included in the operation command, for example, the followings are exemplified.

(1) Data Representing Route, Along which Host Vehicle Travels, by a Set of Road Links The route, along which the host vehicle travels, may be automatically generated based on a given departure place and a destination with reference to map data stored in the storage unit 106. The route may be generated using an external service.

(2) Data Representing Processing to be Executed by Host Vehicle at a Point on Route The processing to be executed by the host vehicle on the route is, but not limited to, for example, "functioning as a mobile store", "receiving a predetermined package", "delivering a predetermined package", and "receiving a receipt or a deposit receipt". The operation plan generated by the operation plan generation unit 1031 is transmitted to the task controller 1033 described below.

The environment detection unit 1032 detects an environment surrounding the vehicle based on data acquired by the sensor 101. A target of detection is, but not limited to, for example, the number or positions of lanes, the number or positions of vehicles around the host vehicle, the number or positions of obstacles (for example, pedestrians, bicycles, structures, buildings, or the like) around the host vehicle, the structure of roads, road signs, or the like. Any target of detection may be applied as long as the target of detection is needed for autonomous traveling. The environment detection unit 1032 may track a detected object. For example, a difference between coordinates of an object detected before one step and current coordinates of the object may be used to obtain a relative speed of the object. Data (hereinafter, referred to as environment data) relating to the environment detected by the environment detection unit 1032 is transmitted to the task controller 1033 described below.

The task controller 1033 controls traveling of the host vehicle based on the operation plan generated by the operation plan generation unit 1031, the environment data generated by the environment detection unit 1032, and the positional information of the host vehicle acquired by the positional information acquisition unit 102. For example, the host vehicle is made to travel along a predetermined route such that an obstacle does not enter a predetermined safety area centering on the host vehicle. As a method of making the vehicle autonomously travel, a known method can be employed. The task controller 1033 executes a task other than traveling based on the operation plan generated by the operation plan generation unit 1031. As the task, sales provision of a commodity or a service to the user, reception of a package from the user, issuance of a receipt or a deposit receipt, and the like can be exemplified.

The purchase information provision unit 1034 on the vehicle 100A side generates and provides commodity-or-the-like purchase information (hereinafter, referred to as purchase information) including information regarding commodities or the like purchased by the user through sales provision of commodities or services (hereinafter, referred to as commodities or the like) to the user executed by the task controller 1033. The purchase information also includes information (hereinafter, referred to as user information) regarding the user who purchases the commodities or the like. As the user information, an ID (hereinafter, referred to as a user ID) unique to the user is known, and can be acquired from the user in a case where the commodities or the like are purchased. Alternatively, a user terminal ID of the user apparatus 300 that is used by each user may be acquired as the user ID. This may be acquired by electronic payment or the like through the user apparatus 300 or using an electronic procedure. The purchase information provision unit 1034 on the vehicle 100 side provides the generated purchase information to the external server apparatus 200 through the communication unit 105.

In a case where the operation plan generation unit 1031 can generate the operation plan based on the operation command acquired from the server apparatus 200, the operation information provision unit 1035 generates information that the vehicle 100 operates based on the operation command. Conversely, in a case where the operation plan cannot be generated based on the operation command acquired from the server apparatus 200, the operation information provision unit 1035 generates information that the vehicle 100 cannot operate based on the operation command. Then, information relating to such operation is transmitted to the server apparatus 200. For example, in a case where the autonomous traveling vehicle 100A is lacking in a commodity or the like to the operation command from the server apparatus 200 or cannot move with a specific user based on the operation command from the server apparatus 200, and is at a predetermined distance or more from the user, information that the autonomous traveling vehicle 100A cannot operate based on the operation command is generated.

The drive unit 104 is a unit that makes the autonomous traveling vehicle 100 travel based on the command generated by the task controller 1033. The drive unit 104 includes, for example, a motor for driving wheels, an inverter, a brake, a steering mechanism, a secondary battery, and the like.

The communication unit 105 has a communication unit for connecting the autonomous traveling vehicle 100A to the network. In the embodiment, the autonomous traveling vehicle 100A can perform communication with another apparatus, for example, the server apparatus 200 by way of the network. The communication unit 105 may further have a communication unit that allows the autonomous traveling vehicle 100A as the host vehicle to perform inter-vehicle communication with other autonomous traveling vehicles 100 (100B, . . . , 100n).

The autonomous traveling vehicle 100A can have a unit for loading a package, a commodity showcase, or a galley. The autonomous traveling vehicle 100A may include a mechanism that delivers solely a predetermined package among a plurality of packages. For example, a housing apparatus having a plurality of housing areas (also referred to as blocks) may be provided in a vehicle cabin, and solely a permitted block may be unlocked. The autonomous traveling vehicle 100A may include a mechanism that delivers a loaded package to another apparatus. For example, the autonomous traveling vehicle 100A may include a mechanism that is connected to an external housing apparatus, such as a home delivery locker, and transfers a package. The autonomous traveling vehicle 100A includes a device that performs electronic payment in selling a commodity or the like. The autonomous traveling vehicle 100A may include a device that issues a receipt or a deposit receipt. The units, such as the mechanisms or the devices, are controlled by the task controller 1033.

Next, the server apparatus 200 will be described. The server apparatus 200 is an apparatus that selects a commodity or the like predicted to be purchased next by the user of the purchase information based on the purchase information acquired from the autonomous traveling vehicle 100. Then, the server apparatus 200 is an apparatus that provides information regarding the user to the autonomous traveling vehicle 100 dealing in the predicted commodity or the like. The server apparatus 200 is also an apparatus that manages the states or the like of the autonomous traveling vehicles 100 and transmits the operation command. The server apparatus 200 transmits the operation command to the autonomous traveling vehicle 100 decided based on the predicted commodity or the like.

The server apparatus 200 is also an apparatus that acquires a plurality of pieces of purchase information from the autonomous traveling vehicles 100 connected through the network and constructs a database (hereinafter, referred to as a sales record information database) of sales record information. As described above, the purchase information includes the user information and information of the purchased commodities or the like. The server apparatus 200 records information, in which the commodities or the like purchased by a certain user are arranged in a time series, based on the user information, that is, information, in which sales records of the commodities or the like are associated with a sales order. Then, such information in a plurality of users is arranged to construct a sales record information database 2031. The sales record information database is configured to be updatable and searchable.

The server apparatus 200 has a communication unit 201, a controller 202, and the storage unit 203. The communication unit 201 is the same as the communication unit 105, and has a communication unit for connecting the server apparatus 200 to the network. Then, the server apparatus 200 is a communication interface that performs communication with the autonomous traveling vehicles 100 by way of the network. The controller 103 has a CPU and a main storage unit similarly to the controller 103, and executes information processing using a program. Of course, the CPU is also a processor, and the main storage unit of the controller 202 is also an example of a main storage device. The CPU in the controller 202 executes a computer program developed to be executable in the main storage unit, and provides various functions. The main storage unit in the controller 202 stores the computer program that is executed by the CPU, data, and the like. The main storage unit in the controller 202 is, a DRAM, a SRAM, a ROM, or the like.

The controller 202 is connected to the storage unit 203. The storage unit 203 is an external storage unit, is used as a storage area that supports the main storage unit of the controller 202, and stores the computer program that is executed by the CPU of the controller 202, data, and the like. The storage unit 203 stores the sales record information database 2031. The storage unit 203 is a hard disk drive, an SSD, or the like.

The controller 202 is a unit that controls the server apparatus 200. The controller 202 has, as functional modules, a purchase information acquisition unit 2021, an information construction unit 2022, a commodity-or-the-like selection unit 2023, a vehicle decision unit 2024, a vehicle information management unit 2025, an operation command generation unit 2026, and a transmission information generation unit 2027. The functional modules are implemented by the CPU of the controller 202 executing a program (according to an embodiment of the disclosure) stored in the main storage unit or the storage unit 203.

The purchase information acquisition unit 2021 acquires and stores purchase information of commodities or the like from the autonomous traveling vehicle 100. The purchase information acquisition unit 2021 stores the acquired purchase information of commodities or the like in the storage unit 203. The acquired purchase information of commodities or the like includes the user information and information regarding the commodities or the like purchased by the user specified in the user information. Accordingly, the purchase information acquisition unit 2021 store sales records of the sold commodities or the like in a sales order for each user. Hereinafter, the sales records of each user are referred to as user sales records. For example, the user information is the user ID. A sex, an age, or the like of the registered user can be specified from the user ID or the like. Information of the purchased commodities or the like includes the name of each commodity or service, identification information, such as a part number for identifying each commodity or service, the number of commodities or services, or the like. For example, information of the purchased commodities or the like may be the types, the number, or the like of cakes. As an example, user sales records relating to a user A are conceptually shown in a table Ta of FIG. 3A, user sales records relating to a user B are conceptually shown in a table Tb of FIG. 3B, and user sales records relating to a user C are conceptually shown in a table Tc of FIG. 3C. In FIGS. 3A to 3C, an example of user sales records relating to a user who purchases a commodity 2 next to a commodity 1 is shown.

The information construction unit 2022 arranges information relating to the users stored in the purchase information acquisition unit 2021, that is, user sales records to construct the sales record information database 2031. The construction of the sales record information database 2031 is performed according to a predetermined program. In the sales record information database 2031, data construction may be performed using a method using statistics or the like. Alternatively, information acquired by the server apparatus 200 through the network may be reflected in the sales record information database 2031. For example, in a case where the sales of a commodity Z accompanying a commodity 2 is started as a new product, the server apparatus 200 may collect information regarding the commodity Z and may incorporate the collected information into the sales record information database 2031 as a next sales record of the commodity 2. FIG. 4 conceptually illustrates a part of the sales record information database 2031. A table of FIG. 4 is constructed based on information of the tables of FIGS. 3A to 3C and other kinds of information according to a predetermined program. The sales record information database 2031, that is, the sales record information may be subdivided depending on the age group, sex, or the like of the user as well as the sales order of the commodities or the like.

The commodity-or-the-like selection unit 2023 is configured to access the sales record information database 2031, that is, the sales record information. Then, the commodity-or-the-like selection unit 2023 accesses the sales record information to select a commodity or a service predicted to be purchased next by the user. In the server apparatus 200, in a case where the purchase information of commodities or the like is acquired from the autonomous traveling vehicle 100, as described above, the purchase information acquisition unit 2021 records the user sales records (see FIGS. 3A to 3C). Then, the commodity-or-the-like selection unit 2023 selects a commodity or the like predicted to be purchased next by the user based on the commodities or the like of the acquired purchase information of commodities or the like. For example, it is assumed that a commodity in the acquired purchase information of commodities or the like is the commodity 2, and a commodity purchased before the commodity 2 in the user sales record of the user ID in the acquired purchase information of commodities or the like is the commodity 1. In this case, the commodity-or-the-like selection unit 2023 accesses the sales record information database 2031, that is, the sales records to search for the sales record having the sales order that the commodity 2 is next to the commodity 1 (FIG. 4). Then, in FIG. 4, since a commodity 5 is stored as a commodity next to the commodity 2, the commodity-or-the-like selection unit 2023 selects the commodity 5 as a commodity or the like predicted to be purchased by a user U specified by the user ID. In a case where the sales record information database 2031 is subdivided depending on the age group, sex, or the like of the user as well as the sales order of the commodities or the like, the sales record information database 2031 may be searched based on the age, sex, or the like of the user decided from the user ID or the like in the purchase information of commodities or the like in addition to the commodity or the like of the acquired purchase information of commodities or the like.

The vehicle decision unit 2024 decides one autonomous traveling vehicle 100 dealing in the commodity 5 selected by the commodity-or-the-like selection unit 2023. In the embodiment, although the vehicle decision unit 2024 decides one vehicle from among the autonomous traveling vehicles 100, one moving object may be decided from among vehicles including autonomous traveling vehicles and moving objects including ships and flying objects (unmanned aircrafts). In this case, the vehicle decision unit 2024 may be referred to as a moving object decision unit. The server apparatus 200 stores a vehicle information database 2032 managed by the vehicle information management unit 2025 described below. Here, the vehicle information database 2032 is stored in the storage unit 203. The vehicle information database 2032 stores the current status of each of the autonomous traveling vehicles 100, for example, the type, the position, and the amount or types of loaded commodities or the like of the mobile store to be updatable. That is, the vehicle decision unit 2024 of the controller 202 of the server apparatus 200 is configured to access information regarding commodities or the like dealt by a plurality of mobile stores including the autonomous traveling vehicle to be a mobile store to be decided. The vehicle decision unit 2024 decides a vehicle loading the commodity or the like decided by the commodity-or-the-like selection unit 2023 by searching the vehicle information database 2032. As a result of searching the vehicle information database 2032, in a case where the autonomous traveling vehicle 100 is found, the vehicle decision unit 2024 decides one autonomous traveling vehicle according to a predetermined program. Here, the autonomous traveling vehicle 100 closest to the user is decided based on information regarding the current position of the user acquired from the user apparatus 300 corresponding to the user ID. A user database 2033 in which the user ID and the user apparatus 300 are associated with each other is stored in the storage unit 203. The user database 2033 is constructed to store data received from the user apparatus 300 through communication between the user apparatus 300 and the server apparatus 200. Since the user database 2033 is stored, it is possible to specify the user apparatus 300 based on the user ID, and to set positional information of the user apparatus 300 to be information indicating the current position of the user. Since the user apparatus 300 is decided based on the user ID, and then, positional information of the user is decided from the user apparatus 300, the user ID is also referred to as information for specifying the current position of the user.

The vehicle information management unit 2025 manages the autonomous traveling vehicles 100 under management. Specifically, the vehicle information management unit 2025 receives information, such as data relating to each of the autonomous traveling vehicles 100, from the autonomous traveling vehicles 100, that is, the controller 103 as the store device of each of the autonomous traveling vehicles 100 in a predetermined cycle. The vehicle information management unit 2025 stores the received information in the vehicle information database 2032 of the storage unit 203. As information relating to the autonomous traveling vehicles 100, the positional information and the vehicle information are used. The vehicle information is, but not limited to, for example, an identifier of the autonomous traveling vehicle 100, the purpose or classification of the autonomous traveling vehicle 100, information regarding a standby point (garage or service office), a door type, a vehicle body size, a trunk size, a load capacity, a full charge traveling range, a traveling range at the present time, a current status, and the like.

The operation command generation unit 2026 generates an operation command that makes the autonomous traveling vehicle 100 decided by the vehicle decision unit 2024 operate with the user. The operation command generation unit 2026 transmits the generated operation command to the autonomous traveling vehicle 100 and commands operation. The operation command includes the user information, in particular, information regarding the user apparatus 300 associated with the user ID.

In a case where information relating to operation generated by the operation information provision unit 1035 is acquired from the autonomous traveling vehicle 100, the transmission information generation unit 2027 generates transmission information to be transmitted to the user apparatus 300 and transmits the transmission information to the user apparatus 300. The transmission information is information regarding the commodity or the like selected by the commodity-or-the-like selection unit 2023 or a place to contact of the autonomous traveling vehicle 100 dealing in the selected commodity or the like.

Next, the user apparatus 300 will be described. The user apparatus 300 is, for example, a portable terminal, a smartphone, a personal computer, or the like. The user apparatus 300A of FIG. 2 as an example has a communication unit 301, a controller 302, and a storage unit 303. The communication unit 301 and the storage unit 303 of the user apparatus 300A are the same as the communication unit 201 and the storage unit 203 of the server apparatus 200, and thus, description thereof will not be repeated. The user apparatus 300A also has a display unit 304, an operating unit 305, and a positional information acquisition unit 306. The display unit 304 is, for example, a liquid crystal display, an electroluminescence panel, or the like. The operating unit 305 may be, for example, a keyboard, a pointing device, or the like. More specifically, in the embodiment, the operating unit 305 includes a touch panel. The positional information acquisition unit 306 is the same as the positional information acquisition unit 102 of the autonomous traveling vehicle 100A, and thus, description thereof will not be repeated.

Similarly to the controller 202, the controller 302 has a CPU and a main storage unit. The CPU of the controller 302 executes an application program (hereinafter, referred to as an application 3021) arranged in the storage unit 303. The application 3021 is, for example, an application program that displays transmission information distributed from a web browser or the server apparatus 200. The application 3021 has a GUI, receives an input of transmission information from the user, and for example, transmits the transmission information to the server apparatus 200 through the network.

In FIG. 2, the autonomous traveling vehicles 100, the server apparatus 200, and the user apparatus 300 are connected by the same network. However, a network that connects autonomous traveling vehicles 100 and the server apparatus 200 may be different from a network that connects the server apparatus 200 and the user apparatus 300.

Figure 5:
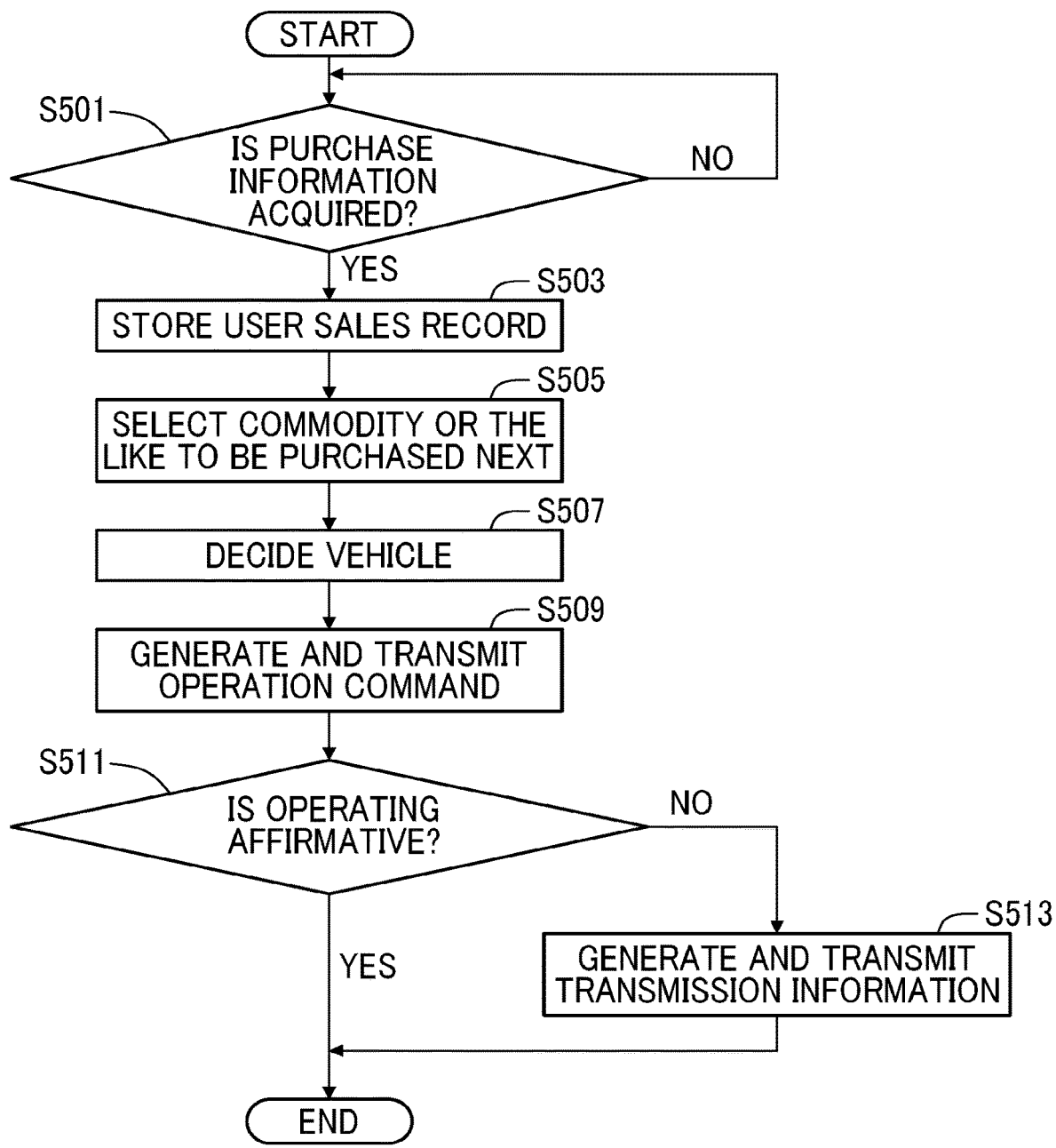
FIG. 5 is a flowchart showing processing of a server apparatus in the system of the first embodiment.

Processing in the system having the above-described configuration will be described referring to a flowchart of FIG. 5. The processing of FIG. 5 is substantially processing in the server apparatus 200.

The controller 202 of the server apparatus 200, in particular, the purchase information acquisition unit 2021 acquires the purchase information of commodities or the like provided and acquired from the purchase information provision unit 1034 on the autonomous traveling vehicle 100 side (the determination in Step S501 is affirmative). The purchase information of commodities or the like includes the user information and information regarding the commodities or the like purchased by the user in the user information. It is assumed that the user information includes the user ID, and a user specified by the user ID is the user U. In a case where the determination in Step S501 is affirmative, next Step S503 is executed.

In a case where the commodity-or-the-like purchase information is acquired, the controller 202 of the server apparatus 200, in particular, the purchase information acquisition unit 2021 stores a purchase record of the commodity or the like of the user U, that is, a sales record as the user sales record (Step S503). In this case, the controller 202 combines the previous sales records of the user U and the present sales record with the user ID of the user U.

Then, the controller 202 of the server apparatus 200, in particular, the commodity-or-the-like selection unit 2023 selects and decides a commodity or the like to be purchased next (Step S505). As described above, in a case where the user U purchases the commodity 2 next to the commodity 1, the sales record information database 2031 of FIG. 4 is searched with the commodity 1 and the commodity 2, the controller 202 predicts the commodity 5 as a commodity or the like to be purchased next by the user U and selects the predicted commodity or the like. For example, the commodity 1 is "room decoration", the commodity 2 is "cake", and the commodity 5 is "flower". Although Step S505 is executed next to Step S503, the steps may be executed in the substantially same timing like one step.

After the commodity or the like to be purchased by the user U is predicted, the controller 202 of the server apparatus 200, in particular, the vehicle decision unit 2024 decides the autonomous traveling vehicle 100 dealing in the predicted commodity or the like (Step S507). As described above, the autonomous traveling vehicle 100 dealing in the commodity 5 is decided based on the vehicle information database 2032. In a case where the commodity 5 is "flower", the autonomous traveling vehicle 100 to be decided may be a vehicle to be a mobile store as a flower store. For example, it is assumed that a store device of a mobile store that provides the purchase information of commodities or the like acquired by the purchase information acquisition unit 2021 is the information processing apparatus 103S including the controller 103 of the autonomous traveling vehicle 100A. In this case, a store device of a mobile store to be decided is, for example, the information processing apparatus 103S including the controller 103 of the autonomous traveling vehicle 100B (see FIGS. 1 and 2). In this case, the autonomous traveling vehicle 100A is a first mobile store, and the autonomous traveling vehicle 100B is a second mobile store. The first mobile store and the second mobile store may be different.

Then, the controller 202 of the server apparatus 200, in particular, the operation command generation unit 2026 generates an operation command such that the decided autonomous traveling vehicle 100B operates to the position of the user U, that is, a position of a user apparatus 300U associated with the user ID of the user U (Step S509). In the embodiment, the user apparatus 300 associated with the user ID of the user U is referred to as the user apparatus 300U. Then, the operation command is transmitted to the autonomous traveling vehicle 100B decided in Step S507. That is, the operation command includes the user information, such as the user ID relating to the user U. In the embodiment, the operation command is a command that instructs the autonomous traveling vehicle 100B to perform autonomous traveling with the position of the user apparatus 300U as a destination.

In the autonomous traveling vehicle 100B to which the operation command is transmitted, the controller 103 performs operation plan generation with the operation plan generation unit 1031. In this case, the controller 103 of the autonomous traveling vehicle 100, in particular, the operation information provision unit 1035 is as follows. For example, in a case where the operation plan generation unit 1031 can generate the operation plan based on the acquired operation command, the operation information provision unit 1035 generates that the autonomous traveling vehicle 100B operates based on the operation command. In a case where the operation plan generation unit 1031 cannot generate the operation plan based on the operation command, the operation information provision unit 1035 generates information that the autonomous traveling vehicle 100B cannot operate based on the operation command. Information relating to such operation is provided to the server apparatus 200. For example, in a case where the current position of the user apparatus 300 corresponding to the user ID acquired through the network, that is, the current position of the user is at a predetermined distance or more from the autonomous traveling vehicle 100, the autonomous traveling vehicle 100B may not operate based on the operation command. In this case, the operation information provision unit 1035 generates information that the autonomous traveling vehicle 100B cannot move to the position of the user U, that is, cannot operate based on the operation command and transmits the generated information to the server apparatus 200. In a case where the controller 103 can generate the operation plan based on the acquired operation command, the autonomous traveling vehicle 100B performs autonomous traveling to the position of the user U as described above.

The controller 202 of the server apparatus 200, in particular, the transmission information generation unit 2027 acquires information relating to operation from the autonomous traveling vehicle 100 and determines whether the acquired information is affirmative information that the autonomous traveling vehicle 100 operates or negative information that the autonomous traveling vehicle 100 cannot operate (Step S511). In a case where the acquired information relating to operation is affirmative information (the determination in Step S511 is affirmative), the routine ends. In a case where the acquired information relating to operation is negative information (the determination in Step S511 is negative), the transmission information generation unit 2027 generates and transmits the transmission information (Step S513). As described above, the transmission information is generates by the transmission information generation unit 2027 of the controller 202 of the server apparatus 200. In a case where negative information relating to operation is acquired, the controller 202 of the server apparatus 200 generates the transmission information to be transmitted to the terminal of the user, that is, the user apparatus 300. The transmission information includes information of the commodity or the like selected by the commodity-or-the-like selection unit 2023 and information regarding a place to contact of the autonomous traveling vehicle 100B dealing in the selected commodity or the like. The transmission information may be any one of information regarding the commodity or the like and information regarding the autonomous traveling vehicle 100. Then, the generated transmission information is transmitted. In the user apparatus 300U to which the transmission information is transmitted, the transmission information is displayed on the display unit 304 with the start of the application 3021. With this, the user U can order the commodity or the like relating to the transmission information, in this case, the commodity 5 through the network or refers to the commodity or the like in purchasing a commodity or the like subsequently.

As described above, with the above-described system, it is possible to suitably associate a certain mobile store with a user who purchases a certain commodity or the like. Therefore, in a case where the predicted commodity or the like is a favorite one, the user can suitably find or encounter a mobile store that deals in the favorite commodity or the like.

Next, a second embodiment of the disclosure will be described. Hereinafter, in a system S2 according to the second embodiment, a difference from the system S1 according to the above-described first embodiment will be primarily described. The components corresponding to the components already described are represented by the same reference numerals, and overlapping description will not be repeated.

Figure 6:
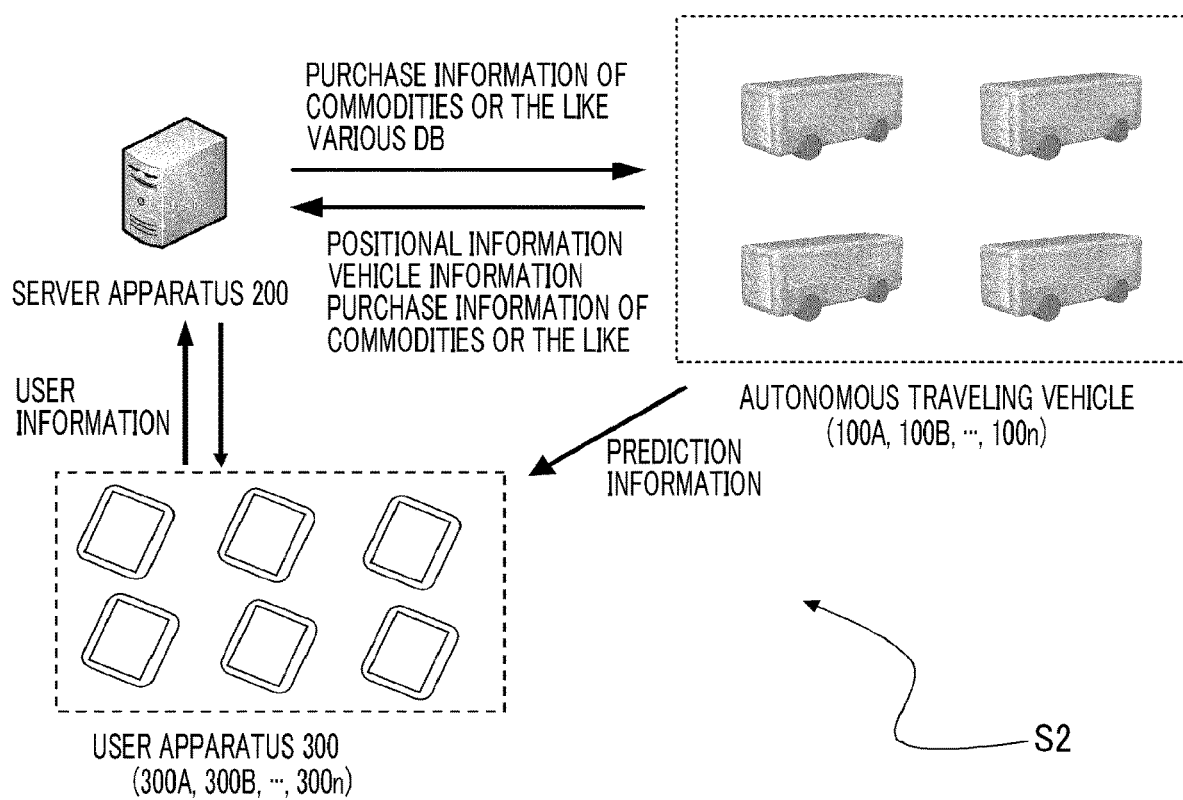
FIG. 6 is an operation example of a system according to a second embodiment.

FIG. 6 is a schematic configuration diagram of the system S2. Similarly to the system S1, the system S2 includes the server apparatus 200 as a management apparatus, and the autonomous traveling vehicles 100 to be mobile stores. The controller 103 of each autonomous traveling vehicle 100 substantially has a function as a store device. Then, in the system S2, as simply shown in FIG. 6, the purchase information of commodities or the like is provided from the server apparatus 200 to the autonomous traveling vehicles 100. Any vehicle among the autonomous traveling vehicles 100 is decided as a vehicle dealing in a commodity or service predicted to be purchased next by the user. In a case where the decided autonomous traveling vehicle 100 cannot move to the user, the autonomous traveling vehicle transmits information to the user apparatus 300.

The schematic configuration of the system S2 will be described referring to FIG. 7. FIG. 7 is a diagram corresponding to FIG. 2 in the first embodiment, and a part of the common configuration with FIG. 2 is omitted. For example, the configurations of the communication unit 105 of the autonomous traveling vehicle 100, the communication unit 201 of the server apparatus 200, and the user apparatus 300A are omitted.

First, the configuration of the server apparatus 200 will be described referring to FIG. 7. The controller 202 of the server apparatus 200 has, as functional modules, a purchase information provision unit 2028 on the server apparatus 200 side in addition to the purchase information acquisition unit 2021, the information construction unit 2022, and the vehicle information management unit 2025 described above. Purchase information of commodities or the like in the purchase information acquisition unit 2021 is hereinafter referred to as "new purchase information". This is to distinguish The purchase information of commodities or the like in the purchase information provision unit 2028 from the purchase information of commodities or the like provided from the purchase information provision unit 1034 on the vehicle 100 side and acquired in the purchase information acquisition unit 2021.

The purchase information provision unit 2028 combines user information and information regarding commodities or the like in the new purchase information acquired by the purchase information acquisition unit 2021 with user sales records (see FIGS. 3A to 3C) including information regarding commodities or the like purchased so far by the user corresponding to the user information. With the combination, the purchase information provision unit 2028 generates the purchase information of commodities or the like. Then, the generated purchase information is provided to the autonomous traveling vehicles 100 to be managed.

In the system S2, the controller 103 of the autonomous traveling vehicle 100 has, as functional modules, a purchase information acquisition unit 1036, a commodity-or-the-like selection unit 1037, a determination unit 1038, and a transmission information generation unit 1039 in addition to the operation plan generation unit 1031, the environment detection unit 1032, the task controller 1033, and the purchase information provision unit 1034 on the vehicle 100 side described above. Then, the autonomous traveling vehicle 100 performs communication with the server apparatus 200 at regular intervals, whereby a copy of the sales record information database 2031 of the server apparatus 200 is substantially stored in the storage unit 106. Since a copy of the user database 2033 is also stored in the storage unit 106, the controller 103 can specify the user apparatus 300 based on the user ID and can know the current position of the user corresponding to the user ID. The purchase information acquisition unit 1036, the commodity-or-the-like selection unit 1037, and the transmission information generation unit 1039 substantially correspond to the purchase information acquisition unit 2021, the commodity-or-the-like selection unit 2023, and the transmission information generation unit 2027, respectively, and thus, description thereof will not be repeated. The determination unit 1038 determines whether or not the commodity or the like selected by the commodity-or-the-like selection unit 1037 is in the host vehicle. In the determination, in particular, information regarding the commodities or the like in vehicle information 1061 stored in the storage unit 106 is referred to.

Figure 8:
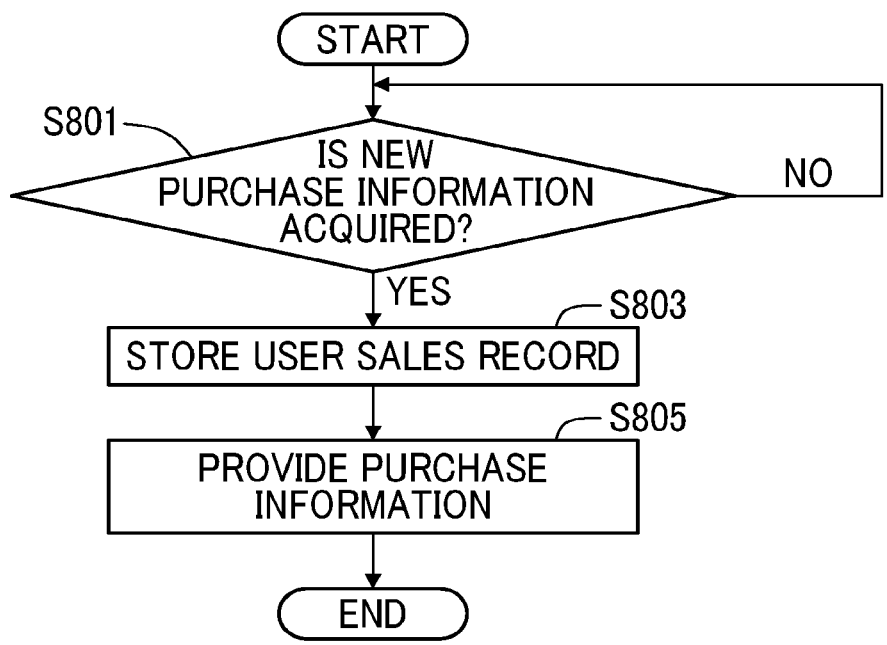
FIG. 8 is a flowchart showing processing of a server apparatus in the system of the second embodiment.
Figure 9:
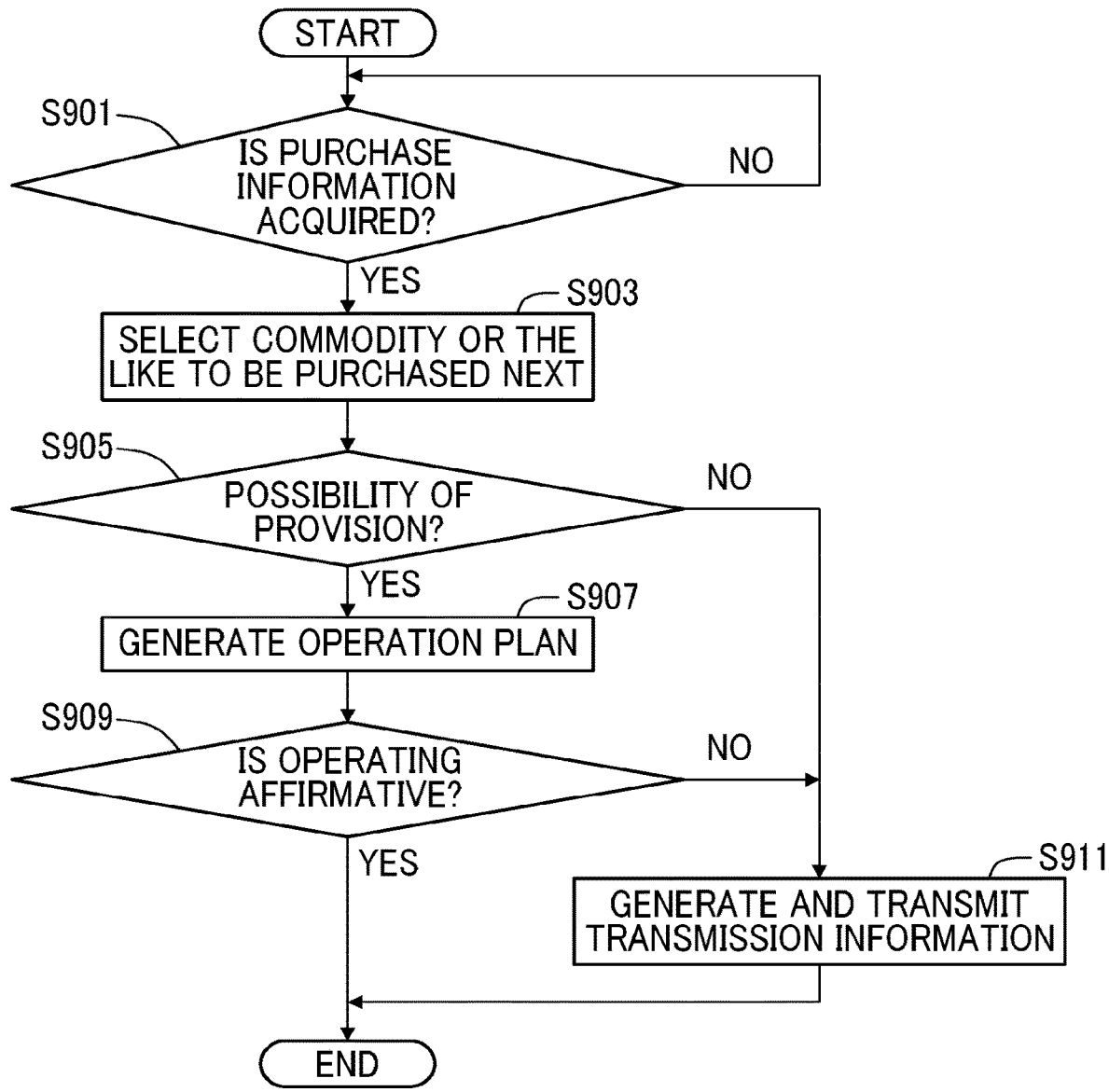
FIG. 9 is a flowchart showing processing of an autonomous traveling vehicle in the system of the second embodiment.

Now, processing in the system S2 having the above-described configuration will be described flowcharts of FIGS. 8 and 9. FIG. 8 substantially shows processing of the server apparatus 200, and FIG. 9 substantially shows processing of the autonomous traveling vehicle 100.

First, in a case where the new purchase information is acquired from the autonomous traveling vehicle 100 as a first mobile store (the determination in Step S801 is affirmative), the controller 202 of the server apparatus 200, in particular, the purchase information acquisition unit 2021 stores a user sales record (Step S803). Then, as described above, the controller 202, in particular, the purchase information provision unit 2028 provides the purchase information of commodities or the like including information regarding the user sales record to the autonomous traveling vehicles 100 to be managed through the network (Step S805). As described above, the purchase information of commodities or the like in Step S805 includes the user information and information regarding the commodity or the like of the new purchase information and the previously purchased commodities or the like. For example, the user information includes the user ID or the like of the user U.

In a case where the purchase information of commodities or the like is provided from the server apparatus 200, the controller 103 of the autonomous traveling vehicle 100, in particular, the purchase information acquisition unit 1036 acquires the purchase information of commodities or the like (the determination in Step S901 is affirmative). Here, the autonomous traveling vehicle 100 that acquires the purchase information of commodities or the like is a second mobile store, and may be an autonomous traveling vehicle other than the autonomous traveling vehicle as a first mobile store that provides the new purchase information in Step S801. Then, the controller 103, in particular, the commodity-or-the-like selection unit 1037 searches the sales record information database 2031 stored in the storage unit 106 with the commodities or the like of the acquired purchase information of commodities or the like and predicts, that is, selects a commodity or the like predicted to be purchased next (Step S903). As described in the first embodiment, in a case where the user U purchases the commodity 2 next to the commodity 1, the database (see FIG. 4) is searched in the sales order of the commodity 1 and the commodity 2. Here, for example, the commodity 5 is selected based on FIG. 4.

Then, the controller 103, in particular, the determination unit 1038 determines whether or not the selected commodity or the like, specifically, the commodity 5 is in the host vehicle, that is, a providable commodity or the like (Step S905). In the determination, the stored vehicle information 1061 is searched with the commodity 5. In a case where the commodity 5 is present, the determination is affirmative, and otherwise, the determination is negative. As described below, processing based on the determination result is executed according to the determination result.

In a case where the selected commodity 5 is in the host vehicle (the determination in Step S905 is affirmative), information regarding the current position of the user apparatus 300 is acquired based on the user information of the purchase information of commodities or the like acquired in Step S901, and an operation plan is generated (Step S907). Then, in a case where the operation plan can be generated (the determination in Step S909 is affirmative), the autonomous traveling vehicle 100 can perform autonomous traveling to the position of the user U. The autonomous traveling vehicle 100 may provide information regarding the predicted commodity or the like to the user apparatus 300 of the user U before moving to the user U and may obtain permission of the user U.

In a case where the selected commodity 5 is not in the host vehicle (the determination in Step S905 is negative) or in a case where the operation plan cannot be generated (the determination in Step S909 is negative), information regarding the commodity 5 or the like is provided to the user apparatus 300 corresponding to the user information of the purchase information of commodities or the like acquired in Step S901 (Step S911). The transmission information generation unit 1039 generates transmission information in order to provide information regarding the selected commodity or the like or information regarding the autonomous traveling vehicle, that is, the second mobile store and transmits the transmission information to the user apparatus 300 as the terminal of the user, or the like (Step S911). While the selected commodity 5 is in the host vehicle (the determination in Step S905 is affirmative), even in a case where the operation plan cannot be generated (the determination in Step S909 is negative), the transmission of the transmission information is performed. Steps S909 and S911 are substantially the same as Steps S511 and S513 of FIG. 5, respectively.

As described above, in the system S2, a part of the processing of the server apparatus 200 in the system S1 is executed by the autonomous traveling vehicle. In the system S2, it is also possible to suitably associate a certain mobile store with a user who purchases a certain commodity or the like.

Next, a third embodiment of the disclosure will be described. Hereinafter, in a system S3 according to the third embodiment, a difference from the systems S1, S2 according to the above-described first and second embodiments will be primarily described. The components corresponding to the components already described are represented by the same reference numerals, and overlapping description will not be repeated.

Figure 10:
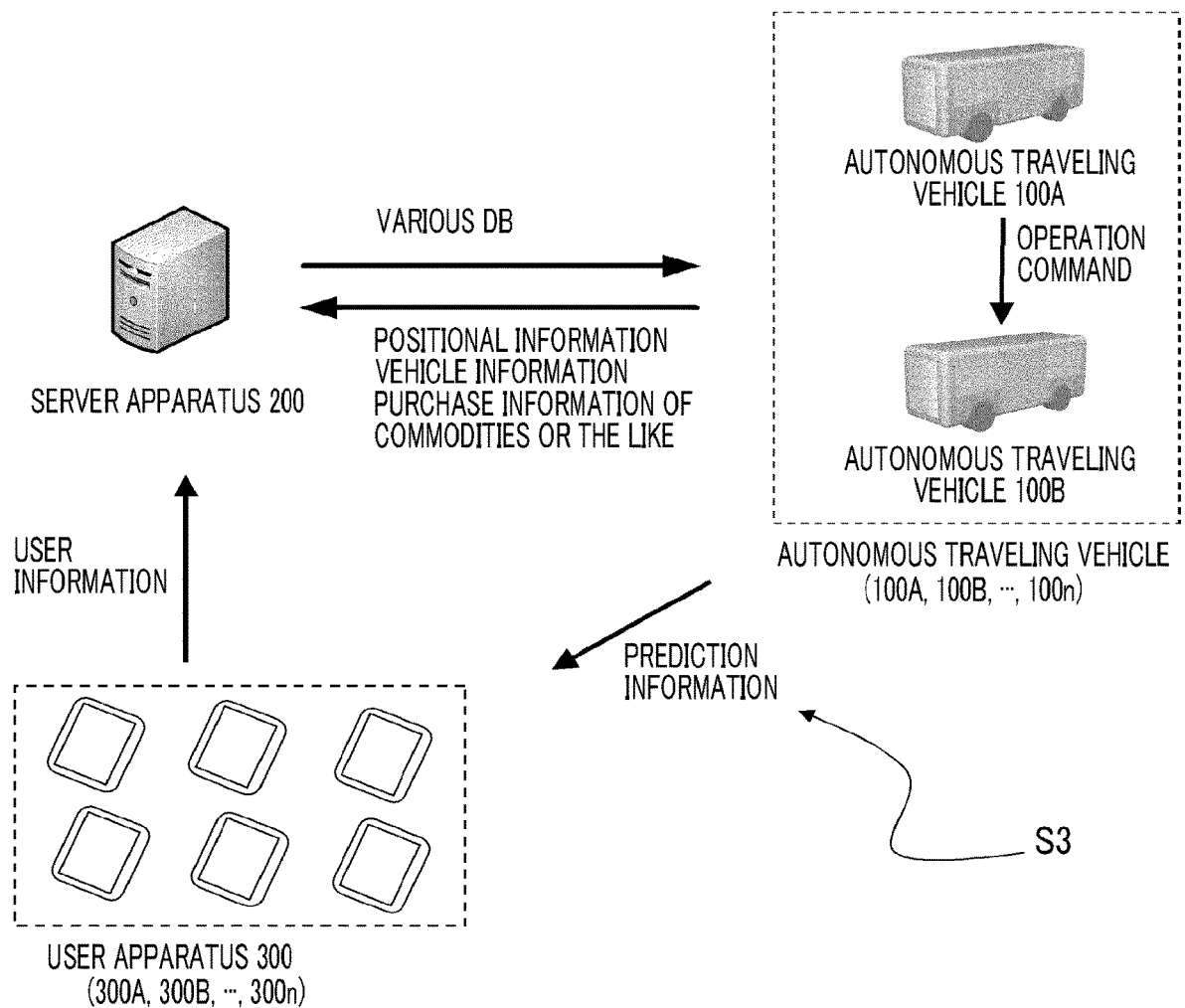
FIG. 10 shows an operation example of a system according to a third embodiment.

FIG. 10 is a schematic configuration diagram of the system S3. Similarly to the systems S1, S2, the system S3 includes the server apparatus 200 as a management apparatus, and the autonomous traveling vehicles 100 to be mobile stores. The controller 103 of each autonomous traveling vehicle 100 is a part of the information processing apparatus 103S as a store device mounted in each autonomous traveling vehicle 100, and substantially has a function as a store device. Then, in the system S3, as simply shown in FIG. 10, an operation command is provided between the autonomous traveling vehicles. Communication between the autonomous traveling vehicles may be performed through a server or may be inter-vehicle communication. In FIG. 10, a store device of a autonomous traveling vehicle 100A where a first user U purchases a commodity or the like, that is, a first store device selects a commodity or the like predicted to be purchased next by the user U and decides a second autonomous traveling vehicle 100B as one vehicle among other autonomous traveling vehicles 100 as a vehicle dealing in the selected commodity or the like. Then, the first autonomous traveling vehicle 100A transmits an operation command including the user information of the user U and information regarding the commodity or the like predicted to be purchased next by the user to the second autonomous traveling vehicle 100B. The second autonomous traveling vehicle 100B can perform autonomous traveling to the position of the user U based on the operation command from the first autonomous traveling vehicle 100A.

The schematic configuration of the system S3 will be described referring to FIG. 11. FIG. 11 is a diagram corresponding to FIG. 2 in the first embodiment, and as in FIG. 7, a part of the common configuration with FIG. 2 is omitted.

First, the configuration of the server apparatus 200 will be described referring to FIG. 11. The controller 202 of the server apparatus 200 has, as functional modules, the purchase information acquisition unit 2021, the information construction unit 2022, and the vehicle information management unit 2025 described above. As described above, the information construction unit 2022 arranges information relating to the users stored in the purchase information acquisition unit 2021, that is, the user sales records to construct the sales record information database 2031. The vehicle information management unit 2025 receives information, such as data relating to the autonomous traveling vehicles 100, from the controller 103 as a store device of each of the autonomous traveling vehicles 100 and constructs and stores the vehicle information database 2032.

In the system S3, the controller 103 of the autonomous traveling vehicle 100 has, as functional modules, a vehicle decision unit 1040 and an operation command generation unit 1041 in addition to the operation plan generation unit 1031, the environment detection unit 1032, the task controller 1033, the purchase information provision unit 1034 on the vehicle 100 side, the purchase information acquisition unit 1036, the commodity-or-the-like selection unit 1037, and the transmission information generation unit 1039 described above. Then, the autonomous traveling vehicle 100 performs communication with the server apparatus 200 at regular intervals, whereby copies of the sales record information database 2031, the vehicle information database 2032, and the user database 2033 of the server apparatus 200 are substantially stored in the storage unit 106. In the third embodiment, the sales record information database 2031 is accompanied by the user sales record to be a base of the creation. In FIG. 11, although the vehicle information 1061 as information regarding the host vehicle is represented separate from the vehicle information database 2032 in the storage unit 106, the vehicle information 1061 may be incorporated into the vehicle information database 2032. Since the vehicle information 1061 is the latest, the vehicle information database 2032 is acquired from the server apparatus 200, and there is a time different between the kinds of information, the vehicle information 1061 is represented separate from the vehicle information database 2032. The vehicle decision unit 1040 and the operation command generation unit 1041 substantially correspond to the vehicle decision unit 2024 and the operation command generation unit 2026, respectively, and thus, detailed description thereof will not be repeated.

Figure 12:
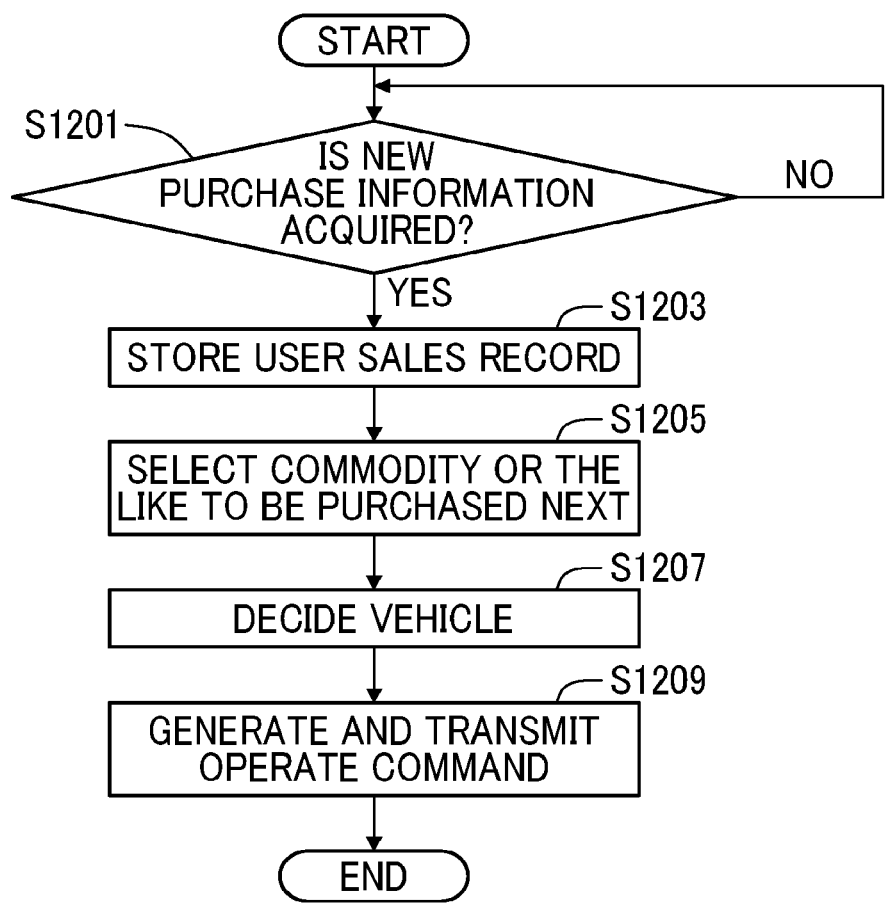
FIG. 12 is a flowchart showing a part of processing in the system of the third embodiment.

Now, processing in the system S3 having the above-described configuration will be described referring to a flowchart of FIG. 12. FIG. 12 substantially shows processing of one autonomous traveling vehicle 100A.

The controller 103 of the autonomous traveling vehicle 100A, in particular, the purchase information provision unit 1034 generates and provides new purchase information of a commodity or the like purchased by the user through sales provision of commodities or the like to the user executed by the task controller 1033 in the controller 103. Then, in a case where the new purchase information is acquired (the determination in Step S1201 is affirmative), the controller 103 of the same autonomous traveling vehicle 100A, in particular, the purchase information acquisition unit 1036 stores the user sales record (Step S1203). Then, the controller 103, in particular, the commodity-or-the-like selection unit 1037 searches the sales record information database 2031 stored in the storage unit 106 based on the commodity or the like of the acquired purchase information of commodities or the like and predicts, that is, select a commodity or the like predicted to be purchased next (Step S1205). As described in the first and second embodiments, in a case where the user U purchases the commodity 2 next to the commodity 1, the database (see FIG. 4) is searched in the sales order of the commodity 1 and the commodity 2. Here, for example, the commodity 5 is selected based on FIG. 4.

Then, the controller 103, in particular, the vehicle decision unit 1040 decides a vehicle, on which the commodity or the like decided by the commodity-or-the-like selection unit 1037 is loaded, by searching the vehicle information database 2032 (Step S1207). Here, the autonomous traveling vehicle 100B different from the autonomous traveling vehicle 100A where the user U purchases the commodities or the like is decided. Then, the controller 103, in particular, the operation command generation unit 1041 generates an operation command of making the decided autonomous traveling vehicle 100B operate to the position of the user U, that is, the position of the user apparatus 300U associated with the user ID of the user U (Step S1209). Then, the operation command is transmitted to the autonomous traveling vehicle 100B decided in Step S1207. The operation command includes the user information of the user U and information regarding the predicted commodity or the like.

Here, the autonomous traveling vehicle 100B, to which the operation command is transmitted, generates an operation plan as a second mobile store with the operation plan generation unit 1031 of the controller 103. With this, the autonomous traveling vehicle 100B can perform autonomous traveling to the position of the user U based on the operation plan generated based on the acquired operation command. In a case where the operation plan cannot be generated based on the operation command, the controller 103 of the autonomous traveling vehicle 100B, in particular, the transmission information generation unit 1039 generates transmission information in order to provide information regarding the selected commodity or the like or information regarding the autonomous traveling vehicle 100B, that is, the second mobile store and transmits the transmission information to the user apparatus 300U as the terminal of the user U.

As described above, in the third embodiment, in the autonomous traveling vehicle 100A as the first mobile store, the controller 103 of the information processing apparatus 103S mounted in the autonomous traveling vehicle 100A can acquire the purchase information of the user who purchases the commodities or the like in the host vehicle, can select the commodity or the like predicted to be purchased next by the user based on the commodities or the like in the acquired purchase information, can decide the autonomous traveling vehicle 100B as the second mobile store dealing in the selected commodity or the like, and can transmit the information regarding the user to the autonomous traveling vehicle 100B.

In the processing of the autonomous traveling vehicle 100A as the first mobile store of the system S3 described above, it is also possible to suitably associate a certain mobile store with a user who purchases a certain commodity or the like.

Next, a fourth embodiment of the disclosure will be described. Hereinafter, in a system S4 according to the fourth embodiment, a difference from the system S3 according to the above-described third embodiment will be primarily described. The components corresponding to the components already described are represented by the same reference numerals, and overlapping description will not be repeated.

Figure 13:
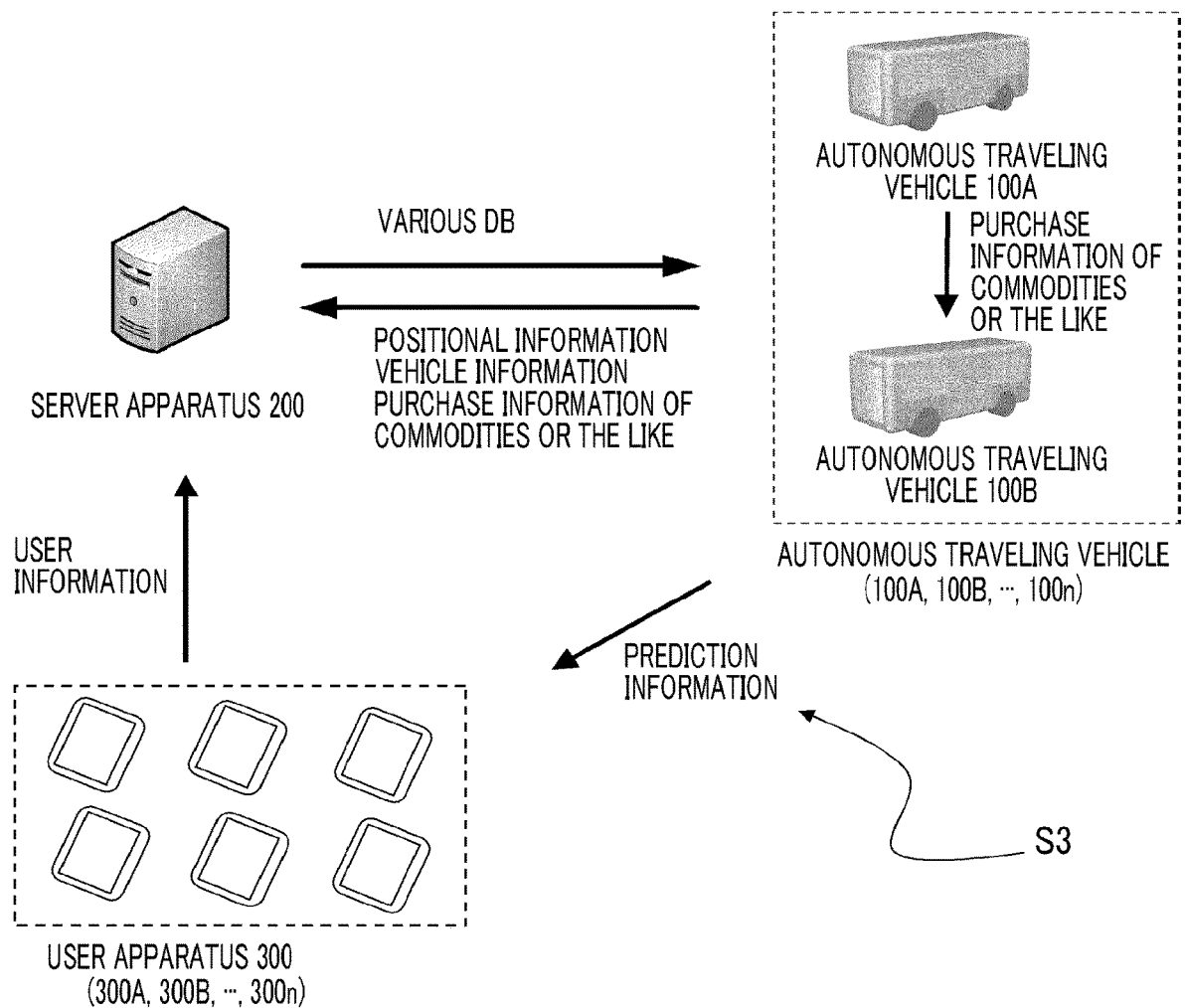
FIG. 13 shows an operation example of a system according to a fourth embodiment.

FIG. 13 is a schematic configuration diagram of the system S4. Similarly to the system S3, the system S4 includes the server apparatus 200 as a management apparatus, and the autonomous traveling vehicles 100 to be mobile stores. The controller 103 of each autonomous traveling vehicle 100 is a part of the information processing apparatus 103S as a store device mounted in each autonomous traveling vehicle 100, and substantially has a function as a store device. Then, in the system S4, as simply shown in FIG. 13, the purchase information of commodities or the like is provided between the autonomous traveling vehicles. In FIG. 13, the store device of the autonomous traveling vehicle 100A where the first user U purchases commodities or the like transmits the purchase information of commodities or the like purchased by the user U to other autonomous traveling vehicles along with the user information of the user U. FIG. 13 shows a case where the purchase information of commodities or the like is transmitted from the first autonomous traveling vehicle 100A to the second autonomous traveling vehicle 100B among other autonomous traveling vehicles. The second autonomous traveling vehicle 100B selects a commodity or the like predicted to be purchased next by the user U based on the acquired purchase information of commodities or the like. The second autonomous traveling vehicle 100B determines whether or not the selected commodity or the like is a commodity or the like providable in the second autonomous traveling vehicle 100B and executes processing based on the determination result.

The schematic configuration of the system S4 will be described referring to FIG. 14. As in FIG. 11, FIG. 14 is a diagram corresponding to FIG. 2 in the first embodiment, and a part of the common configuration with FIG. 2 is omitted.

Figure 14:
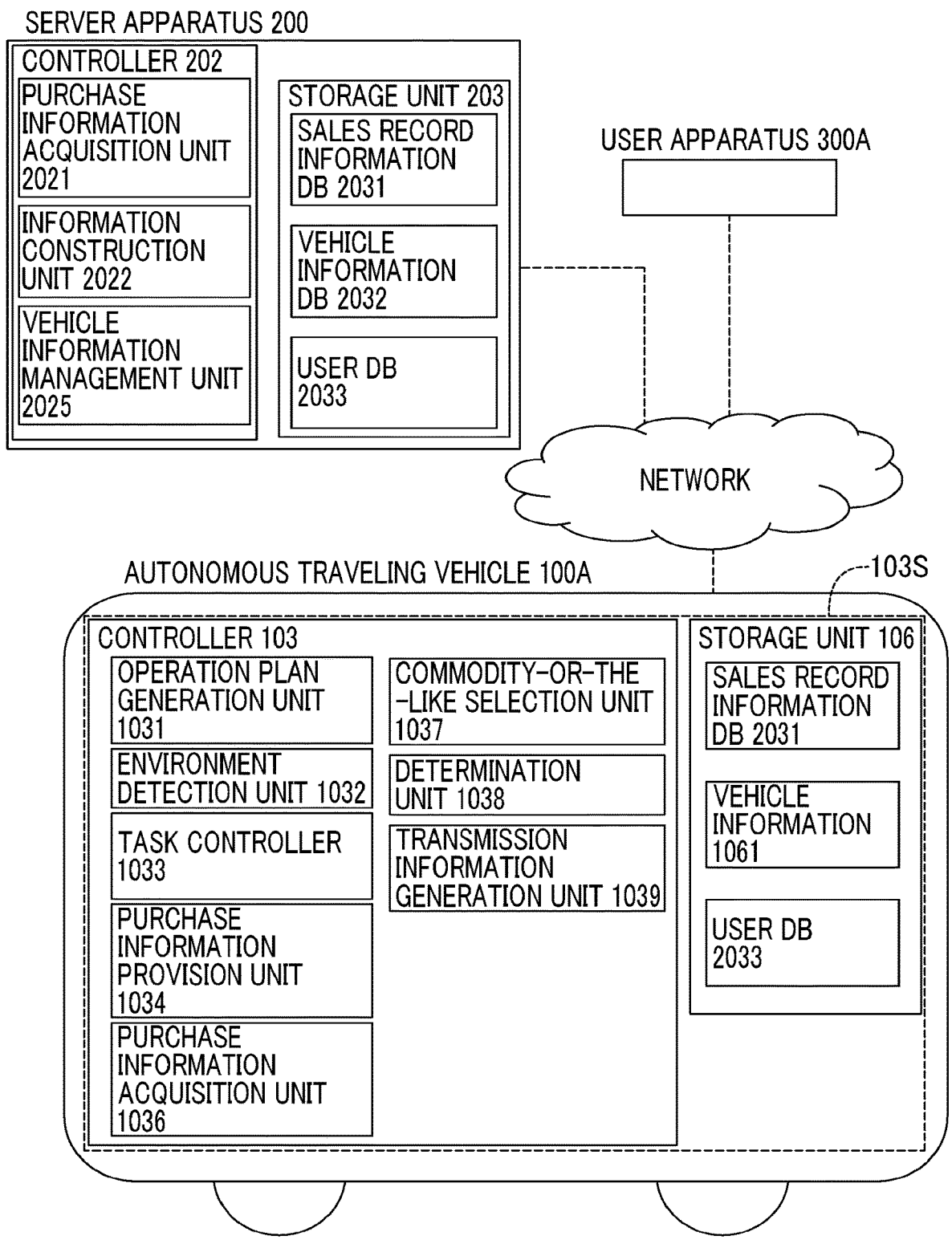
FIG. 14 is a block diagram schematically illustrating an example of components in the system of FIG. 13.

In FIG. 14, the configuration and the like of the server apparatus 200 are substantially the same as those of the server apparatus 200 of FIG. 11 in the system S3 of the third embodiment. In the system S4, the controller 103 of the autonomous traveling vehicle 100 has, as functional modules, the determination unit 1038 in addition to the operation plan generation unit 1031, the environment detection unit 1032, the task controller 1033, the purchase information provision unit 1034 on the vehicle 100 side, the purchase information acquisition unit 1036, the commodity-or-the-like selection unit 1037, and the transmission information generation unit 1039 described above. Then, the autonomous traveling vehicle 100 performs communication with the server apparatus 200 at regular intervals, whereby copies of the sales record information database 2031 and the user database 2033 of the server apparatus 200 are substantially stored in the storage unit 106. In the storage unit 106, the vehicle information 1061 of the host vehicle is also stored. The databases 2031, 2033 and the vehicle information 1061 are as described in the third embodiment.

Now, processing in the system S4 having the above-described configuration will be described referring to a flowchart of FIG. 15. FIG. 15 substantially shows processing of one autonomous traveling vehicle 100B.

In a case where the new purchase information of the commodity or the like transmitted from the purchase information provision unit 1034 of the controller 103 of the autonomous traveling vehicle 100A as the first mobile store is acquired (the determination in Step S1501 is affirmative), The controller 103 of the autonomous traveling vehicle 100B as the second mobile store, in particular, the purchase information acquisition unit 1036 stores a user sales record (Step S1503). Then, the controller 103, in particular, the commodity-or-the-like selection unit 1037 searches the sales record information database 2031 stored in the storage unit 106 based on the commodities or the like of the acquired purchase information of commodities or the like and predicts, that is, selects a commodity or the like predicted to be purchased next by the user U (Step S1505). As described above, in a case where the user U purchases the commodity 2 next to the commodity 1, the database (see FIG. 4) is searched in a sales order of the commodity 1 and the commodity 2. Here, for example, the commodity 5 is selected based on FIG. 4.

Then, the controller 103, in particular, the determination unit 1038 determines whether or not the selected commodity or the like, specifically, the commodity 5 is in the host vehicle, that is, a providable commodity or the like (Step S1507). In the determination, the stored vehicle information 1061 is searched with the commodity 5. In a case where the commodity 5 is present, the determination is affirmative, and otherwise, the determination is negative. Then, processing based on the determination result is executed according to the determination result. Steps S1509 to S1513 correspond to Steps S907 to S911 of FIG. 9, respectively, and thus, further description will not be repeated.

As described above, in the fourth embodiment, in the autonomous traveling vehicle 100A as the first mobile store, the controller 103 of the information processing apparatus 103S mounted in the autonomous traveling vehicle 100A acquires the purchase information of the user who purchases the commodities or the like in the host vehicle and transmits the acquired purchase information to other autonomous traveling vehicles. The autonomous traveling vehicle 100B that acquires the purchase information selects the commodity or the like predicted to be purchased next by the user based on the commodities or the like in the purchase information as the second mobile store and determines whether or not the selected commodity or the like is providable. Then, processing based on the determination result is executed.

In the processing of the autonomous traveling vehicle 100B as the second mobile store of the system S4 described above, it is also possible to suitably associate a certain mobile store with a user who purchases a certain commodity or the like.

The above-described embodiments are just examples, and the disclosure may be appropriately modified to be executed without departing from the spirit and scope of the disclosure. The processing or units described in the present disclosure can be freely combined and implemented as long as no technical contradiction arises.

Processing described to be executed by one apparatus may be shared and executed by a plurality of apparatuses. For example, the server apparatus 200 as an information processing apparatus does not need to be one computer, and may be constituted as a system including a plurality of computers. Alternatively, processing described to be executed by different apparatuses may be executed by one apparatus. In a computer system, a hardware configuration (server configuration) that implements each function may be flexibly changed.

The disclosure may also be implemented by supplying a computer program mounted with the functions described in the above-described embodiments to at least one computer and causing one or more processors in the computer to read and execute the program. Such a computer program may be provided to the computer by a non-transitory computer-readable storage medium connectable to a system bus of the computer or may be provided to the computer through a network. The non-transitory computer-readable storage medium includes, for example, any type of disk, such as a magnetic disk (a Floppy (Registered Trademark) disk, a hard disk drive (HDD), or the like), or an optical disk (a CD-ROM, a DVD, a Blu-ray disc, or the like), a read only memory (ROM), a random access memory (RAM), an EPROM, an EEPROM, a magnetic card, a flash memory, an optical card, or any type of medium suitable for storing electronic instructions.

What is claimed is:

1. A system comprising:
a management apparatus; and
a plurality of store devices provided in a plurality of mobile stores, respectively, wherein:
the management apparatus includes a controller configured to:
acquire commodity-or-the-like purchase information of a user in a first mobile store from a store device of the first mobile store including accessing sales record information, in which sales records of commodities or services are associated with a sales order,
select a commodity or a service predicted to be purchased next by the user based on the commodities or the services in the acquired commodity-or-the-like purchase information including selecting the commodity or the service predicted to be purchased next by the user based on the sales record information, and
transmit information regarding the user to a store device of a second mobile store dealing in the selected commodity or service;
the information regarding the user includes information indicating a current position of the user;
the store device of the second mobile store is configured to:
in a case where the information regarding the user is received, determine whether or not an operation plan for causing the second mobile store to travel to the current position of the user can be generated,
in a case where the operation plan can be generated:
generate the operation plan, and
make the second mobile store perform autonomous travelling to the current position of the user according to the operation plan including acquiring a current position of the second mobile store using signals received from a satellite positioning system, generating a travelling route based upon the current position of the user and the current position of the second mobile store, sensing vehicle surroundings while performing the autonomous travelling on the travelling route, and causing the second mobile store to perform the autonomous travelling using a motor, a brake, and a steering mechanism, and
in a case where the operation plan cannot be generated because a distance from the current position of the user is greater than a predetermined distance from the second mobile store, transmit a signal to the management apparatus indicating that the second mobile store is unable to generate the operation plan; and
the controller is further configured to transmit information regarding the selected commodity or service or information regarding the second mobile store to a terminal of the user in a case where the signal indicating that the second mobile store is unable to generate the operation plan is received from the second mobile store.

2. The system according to claim 1, wherein the controller is configured to access information regarding commodities or services dealt in the mobile stores including the second mobile store.

3. The system according to claim 1, wherein the controller is configured to select the second mobile store dealing in the selected commodity or service from among a plurality of second mobile stores.

4. The system according to claim 1, wherein the information transmitted to the terminal of the user includes position information of the second mobile store.

5. The system according to claim 1, wherein the store device of the second mobile store is configured to, in a case where the operation plan cannot be generated because the selected commodity or service is not providable by the second mobile store, transmit the signal to the management apparatus indicating that the second mobile store is unable to generate the operation plan.

6. A system comprising:
a management apparatus; and
a plurality of store devices provided in a plurality of mobile stores, respectively, wherein:

the management apparatus is configured to execute acquiring commodity-or-the-like purchase information of a user in a first mobile store from a store device of the first mobile store including accessing sales record information, in which sales records of commodities or services are associated with a sales order, and transmitting the acquired commodity-or-the-like purchase information to a store device of a second mobile store, the store device of the second mobile store is configured to:
determine whether or not a predicted commodity or service predicted to be purchased next by the user is a commodity or a service providable in the second mobile store based on the acquired commodity-or-the-like purchase information, the predicted commodity or the service predicted to be purchased next by the user being selected based on the sales record information;
receive information regarding the user including information indicating a current position of the user;
in a case where the information regarding the user is received, determine whether or not an operation plan for causing the second mobile store to travel to the current position of the user can be generated;
in a case where the operation plan can be generated: generate the operation plan, and
make the second mobile store perform autonomous travelling to the current position of the user according to the operation plan including acquiring a current position of the second mobile store using signals received from a satellite positioning system, generating a travelling route based upon the current position of the user and the current position of the second mobile store, sensing vehicle surroundings while performing the autonomous travelling on the travelling route, and causing the second mobile store to perform the autonomous travelling using a motor, a brake, and a steering mechanism; and
in a case where the operation plan cannot be generated, transmit a signal to the management apparatus indicating that the second mobile store is unable to generate the operation plan, and
the management apparatus is further configured to transmit information regarding the predicted commodity or service or information regarding the second mobile store to a terminal of the user in a case where the signal indicating that the second mobile store is unable to generate the operation plan is received from the second mobile store.

7. The system according to claim 6, wherein the information transmitted to the terminal of the user includes position information of the second mobile store.

8. An information processing apparatus comprising:
a controller configured to:
acquire commodity-or-the-like purchase information of a user in a first mobile store including accessing sales record information, in which sales records of commodities or services are associated with a sales order,
select a commodity or a service predicted to be purchased next by the user based on the commodities or the services in the acquired commodity-or-the-like purchase information of the user including selecting the commodity or the service predicted to be purchased next by the user based on the sales record information, and
transmit information regarding the user to a second mobile store dealing in the selected commodity or service, wherein:
the information regarding the user includes information indicating a current position of the user;
a store device of the second mobile store is configured to:
in a case where the information regarding the user is received, determine whether or not an operation plan for causing the second mobile store to travel to the current position of the user can be generated,
in a case where the operation plan can be generated: generate the operation plan, and
make the second mobile store perform autonomous travelling to the current position of the user according to the operation plan including acquiring a current position of the second mobile store using signals received from a satellite positioning system, generating a travelling route based upon the current position of the user and the current position of the second mobile store, sensing vehicle surroundings while performing the autonomous travelling on the travelling route, and causing the second mobile store to perform the autonomous travelling using a motor, a brake, and a steering mechanism, and
in a case where the operation plan cannot be generated because a distance from the current position of the user is greater than a predetermined distance from the second mobile store, transmit a signal to the controller indicating that the second mobile store is unable to generate the operation plan; and
the controller is further configured to transmit information regarding the selected commodity or service or information regarding the second mobile store to a terminal of the user in a case where the signal indicating that the second mobile store is unable to generate the operation plan is received from the second mobile store.

9. The information processing apparatus according to claim 8, wherein the controller is configured to access information regarding commodities or services dealt in the mobile stores including the second mobile store.

10. The information processing apparatus to claim 8, wherein the information transmitted to the terminal of the user includes position information of the second mobile store.

11. An information processing apparatus that is provided in a first mobile store among a plurality of mobile stores, the information processing apparatus comprising:
a controller configured to:
acquire commodity-or-the-like purchase information of a user in the first mobile store including accessing sales record information, in which sales records of commodities or services are associated with a sales order,
select a commodity or a service predicted to be purchased next by the user based on the commodities or the services in the acquired commodity-or-the-like purchase information of the user including selecting the commodity or the service predicted to be purchased next by the user based on the sales record information, and
transmit information regarding the user to a second mobile store dealing in the selected commodity or service, wherein:
the information regarding the user includes information indicating a current position of the user;
a store device of the second mobile store is configured to:

in a case where the information regarding the user is received, determine whether or not an operation plan for causing the second mobile store to travel to the current position of the user can be generated, in a case where the operation plan can be generated: generate the operation plan, and make the second mobile store perform autonomous travelling to the current position of the user according to the operation plan including acquiring a current position of the second mobile store using signals received from a satellite positioning system, generating a travelling route based upon the current position of the user and the current position of the second mobile store, sensing vehicle surroundings while performing the autonomous travelling on the travelling route, and causing the second mobile store to perform the autonomous travelling using a motor, a brake, and a steering mechanism and in a case where the operation plan cannot be generated because a distance from the current position of the user is greater than a predetermined distance from the second mobile store, transmit a signal to the controller indicating that the second mobile store is unable to generate the operation plan; and the controller is further configured to transmit information regarding the selected commodity or service or information regarding the second mobile store to a terminal of the user in a case where the signal indicating that the second mobile store is unable to generate the operation plan is received from the second mobile store.

12. The information processing apparatus according to claim 11, wherein the information transmitted to the terminal of the user includes position information of the second mobile store.

13. An information processing apparatus that is provided in a second mobile store among a plurality of mobile stores, the information processing apparatus comprising:

a controller configured to:

execute acquiring commodity-or-the-like purchase information of a user in a first mobile store from a store device of the first mobile store including accessing sales record information, in which sales records of commodities or services are associated with a sales order, determine whether or not a predicted commodity or service predicted to be purchased next by the user is a commodity or a service providable in the second mobile store based on the acquired commodity-or-the-like purchase information, the predicted commodity or the service predicted to be purchased next by the user being selected based on the sales record information, receive information regarding the user including information indicating a current position of the user;

in a case where the information regarding the user is received, determine whether or not an operation plan for causing the second mobile store to travel to the current position of the user can be generated;

in a case where the operation plan can be generated: generate the operation plan, and make the second mobile store perform autonomous travelling to the current position of the user including acquiring a current position of the second mobile store using signals received from a satellite positioning system, generating a travelling route based upon the current position of the user and the current position of the second mobile store, sensing vehicle surroundings while performing the autonomous travelling on the travelling route, and causing the second mobile store to perform the autonomous travelling using a motor, a brake, and a steering mechanism; and in a case where the operation plan cannot be generated because a distance from the current position of the user is greater than a predetermined distance from the second mobile store, transmit a signal to a management apparatus indicating that the second mobile store is unable to generate the operation plan, wherein the management apparatus is configured to transmit information regarding the predicted commodity or service or information regarding the second mobile store to a terminal of the user in a case where the signal indicating that the second mobile store is unable to generate the operation plan is received from the second mobile store.

14. The information processing apparatus according to claim 13, wherein the information transmitted to the terminal of the user includes position information of the second mobile store.

15. An information processing method comprising:

acquiring commodity-or-the-like purchase information of a user in a first mobile store from a store device of the first mobile store including accessing sales record information, in which sales records of commodities or services are associated with a sales order, selecting a commodity or a service predicted to be purchased next by the user based on the commodities or the services in the acquired commodity-or-the-like purchase information including selecting the commodity or the service predicted to be purchased next by the user based on the sales record information, transmitting information regarding the user to a store device of a second mobile store dealing in the selected commodity or service, the information regarding the user including information indicating a current position of the user, determining whether or not an operation plan for causing the second mobile store to travel to the current position of the user can be generated, in a case where the operation plan can be generated, generating the operation plan; and making the second mobile store perform autonomous travelling to the current position of the user including acquiring a current position of the second mobile store using signals received from a satellite positioning system, generating a travelling route based upon the current position of the user and the current position of the second mobile store, sensing vehicle surroundings while performing the autonomous travelling on the travelling route, and causing the second mobile store to perform the autonomous travelling using a motor, a brake, and a steering mechanism, in a case where the operation plan cannot be generated because a distance from the current position of the user is greater than a predetermined distance from the second mobile store, transmitting a signal indicating that the second mobile store is unable to generate the operation plan, and transmitting information regarding the selected commodity or service or information regarding the second mobile store to a terminal of the user in a case where the signal indicating that the second mobile store is unable to generate the operation plan is transmitted.

16. The method according to claim 15, wherein the information transmitted to the terminal of the user includes position information of the second mobile store.

17. A non-transitory computer readable medium storing a program that causes at least one computer to execute:
- acquiring commodity-or-the-like purchase information of a user in a first mobile store from a store device of the first mobile store including accessing sales record information, in which sales records of commodities or services are associated with a sales order,
- selecting a commodity or a service predicted to be purchased next by the user based on the commodities or the services in the acquired commodity-or-the-like purchase information including selecting the commodity or the service predicted to be purchased next by the user based on the sales record information,
- transmitting information regarding the user to a store device of a second mobile store dealing in the selected commodity or service, the information regarding the user including information indicating a current position of the user,
- determining whether or not an operation plan for causing the second mobile store to travel to the current position of the user can be generated,
- in a case where the operation plan can be generated, generating the operation plan; and
- making the second mobile store perform autonomous travelling to the current position of the user including acquiring a current position of the second mobile store using signals received from a satellite positioning system, generating a travelling route based upon the current position of the user and the current position of the second mobile store, sensing vehicle surroundings while performing the autonomous travelling on the travelling route, and causing the second mobile store to perform the autonomous travelling using a motor, a brake, and a steering mechanism,
- in a case where the operation plan cannot be generated because a distance from the current position of the user is greater than a predetermined distance from the second mobile store, transmitting a signal indicating that the second mobile store is unable to generate the operation plan, and
- transmitting information regarding the selected commodity or service or information regarding the second mobile store to a terminal of the user in a case where the signal indicating that the second mobile store is unable to generate the operation plan is transmitted.

18. The non-transitory computer readable medium according to claim 17, wherein the information transmitted to the terminal of the user includes position information of the second mobile store.

* * * * *